United States Patent [19]

Titsworth et al.

[11] Patent Number: 4,931,964
[45] Date of Patent: Jun. 5, 1990

[54] VEHICLE WHEEL ALIGNMENT APPARATUS AND METHOD

[75] Inventors: Raymond Titsworth, Conway; J. Tom Lipe, Little Rock; James L. Dale; Hanford D. Monroe, both of Conway; Jerry M. Hill, North Little Rock, all of Ark.

[73] Assignee: FMC Corporation, Chicago, Ill.

[21] Appl. No.: 648,442

[22] Filed: Sep. 7, 1984

[51] Int. Cl.$^5$ .................. G01B 7/315; G01B 11/275
[52] U.S. Cl. .................. 364/559; 33/288; 356/152; 356/155
[58] Field of Search .............. 364/559, 550, 551, 556, 364/424, 425, 521, 525; 33/288, 228

[56] References Cited

U.S. PATENT DOCUMENTS

| | | | |
|---|---|---|---|
| 4,097,157 | 6/1978 | Lill | 356/152 |
| 4,126,943 | 11/1978 | Senften | 33/288 X |
| 4,130,362 | 12/1978 | Lill et al. | 356/152 |
| 4,150,897 | 4/1979 | Roberts, Jr. et al. | 356/152 |
| 4,154,531 | 5/1979 | Roberts, Jr. et al. | 356/152 |
| 4,192,074 | 3/1980 | Chang | 33/228 |
| 4,239,389 | 12/1980 | Hollandsworth et al. | 356/155 |
| 4,302,104 | 11/1981 | Hunter | 356/152 |
| 4,319,838 | 3/1982 | Grossman et al. | 33/288 X |
| 4,375,130 | 3/1983 | Lill | 33/328 |
| 4,381,548 | 4/1983 | Grossman et al. | 33/288 X |
| 4,383,370 | 5/1983 | Van Blerk et al. | 33/203 |
| 4,389,793 | 6/1983 | Butler | 33/336 |
| 4,394,798 | 7/1983 | Beissbarth | 33/335 |
| 4,402,603 | 9/1983 | Lill | 356/152 |
| 4,500,201 | 2/1985 | Lill | 33/288 X |
| 4,574,490 | 3/1986 | Curchod | 33/288 X |

FOREIGN PATENT DOCUMENTS

| | | |
|---|---|---|
| 01811 | 11/1983 | Fed. Rep. of Germany . |
| 2455267 | 12/1979 | France . |
| 2496257 | 12/1980 | France . |
| 0071843 | 2/1983 | Italy . |

*Primary Examiner*—Felix D. Gruber
*Attorney, Agent, or Firm*—Henry M. Stanley; Ronald C. Kamp; R. B. Megley

[57] ABSTRACT

A wheel alignment system includes either four wheel mountable alignment heads or two alignment heads and two retroreflectors or two alignment heads alone together with a control console and display. A main processing unit is included in the console for performing calculations and for controlling systems function control components communications sequences. Each console function control component includes its own controller. The control console further includes a CRT display module and optional voice instruction and printer output modules. A bar code reader is available for quick specifications entry. Communications and decision making instructions are downloaded from the controller in each console function control component to the main processing unit at initialization. Communication between the heads and the console is accomplished either through the use of conducting cords or infrared transmission and reception. Each alignment head also includes a controller which controls collection of alignment data in parallel at each head as well as serial transmission from each head to the console during discrete transmission periods as required by the main processing unit.

46 Claims, 16 Drawing Sheets

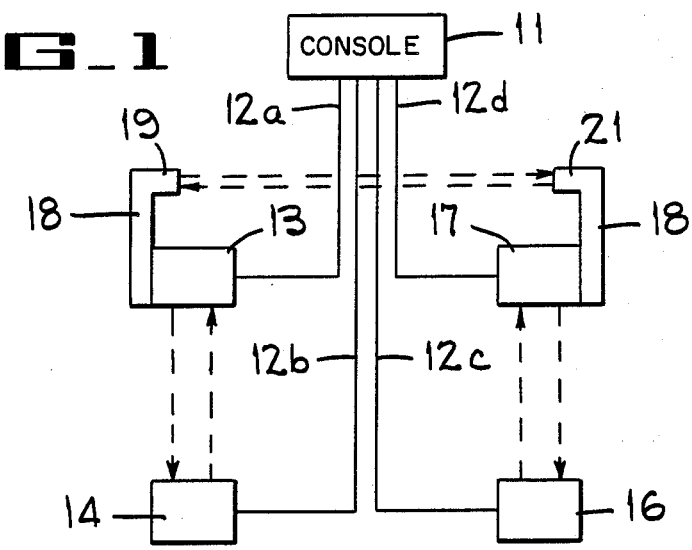
FIG_1
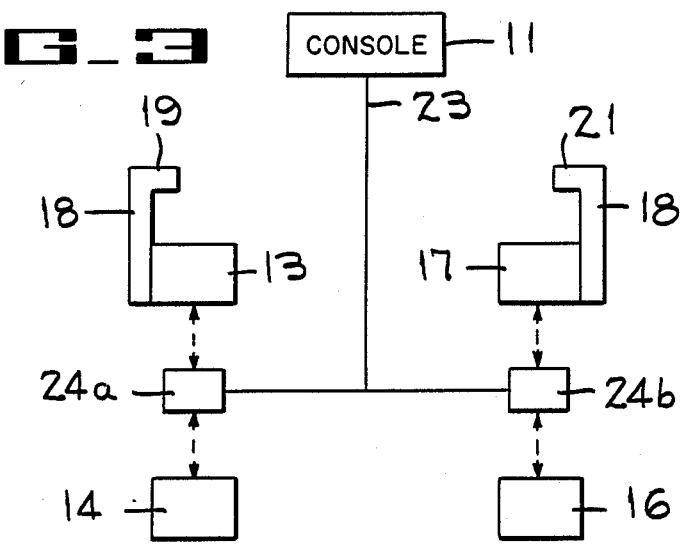
FIG_3
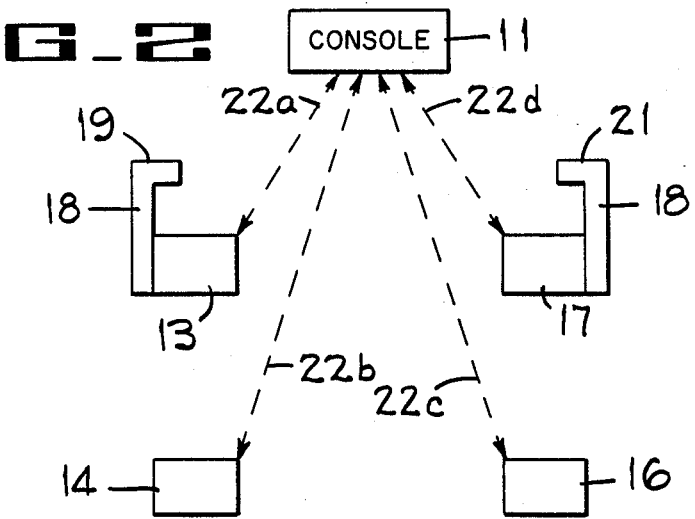
FIG_2

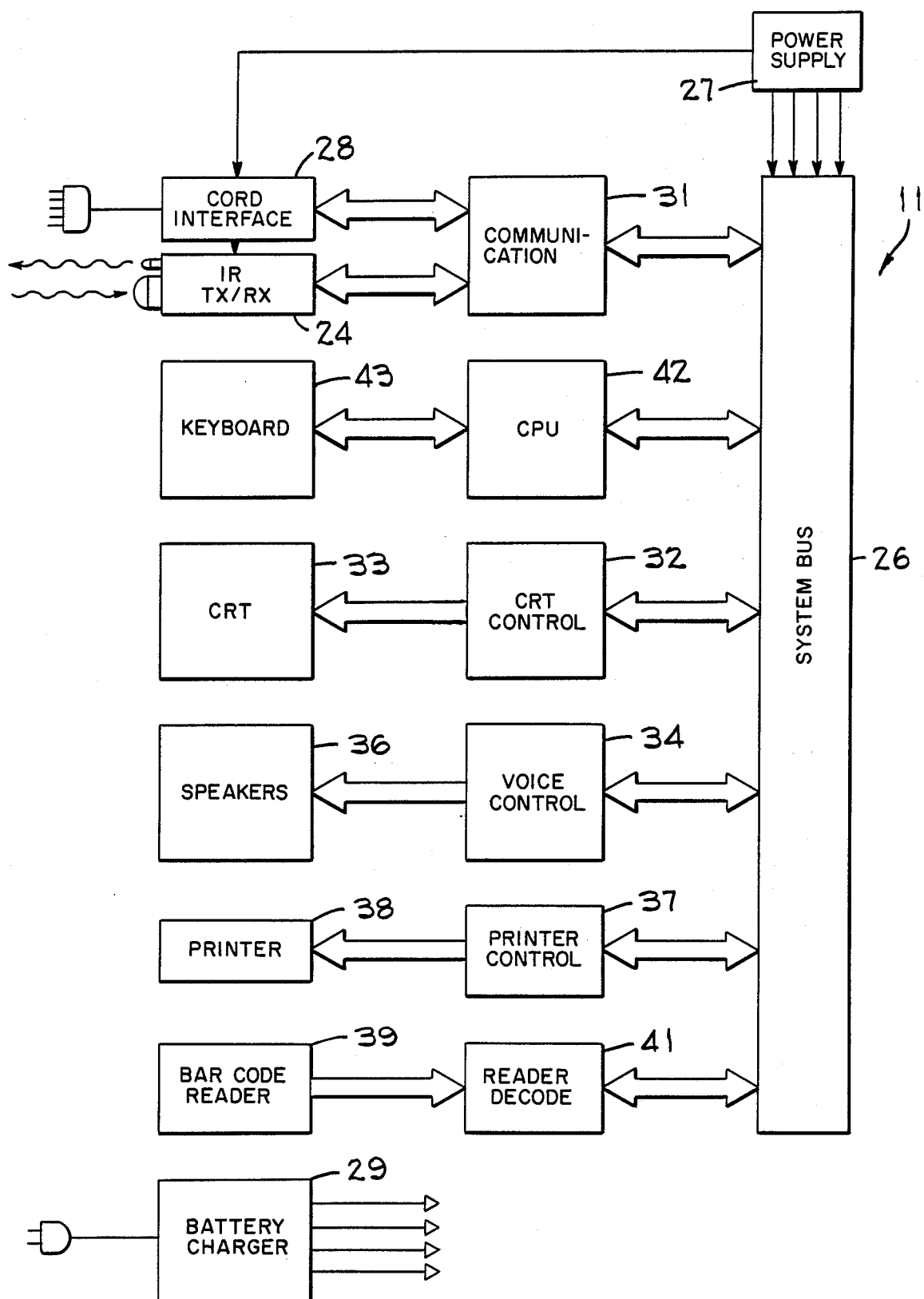
FIG_4

FIG_5
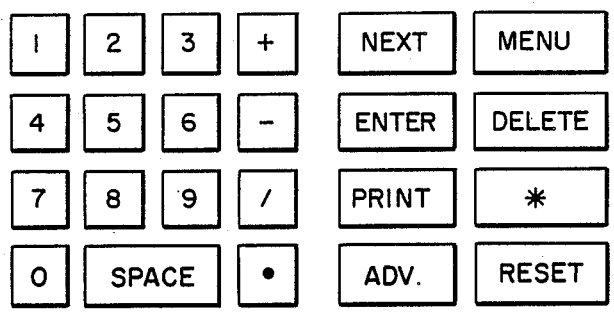
FIG_7
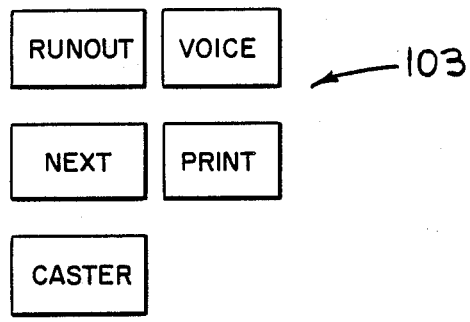
FIG_6
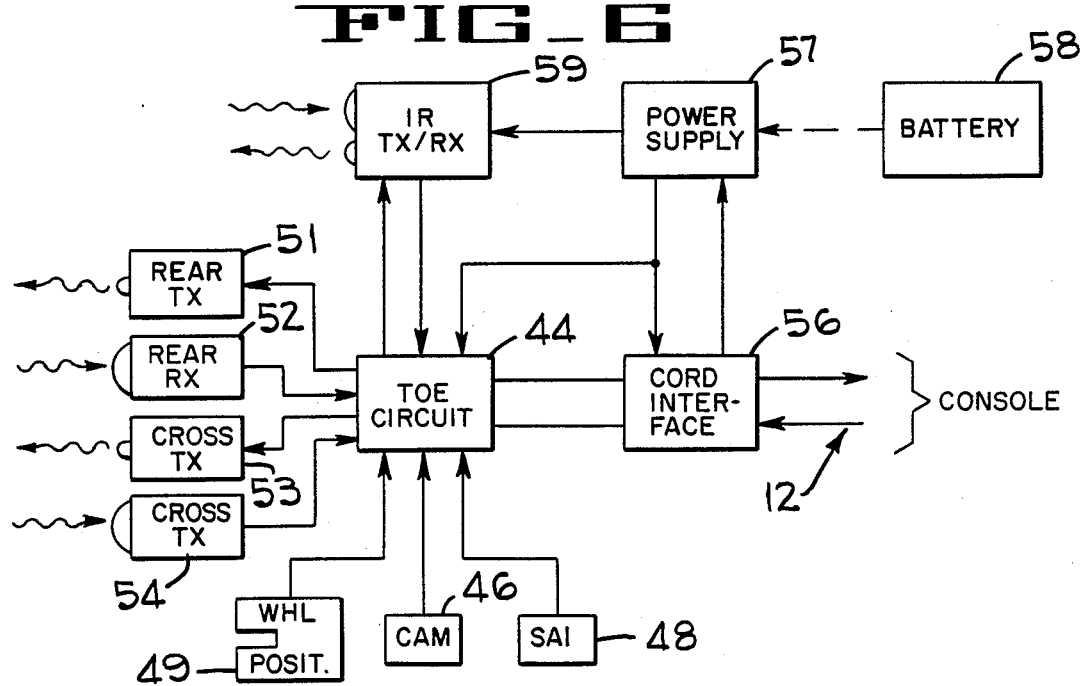

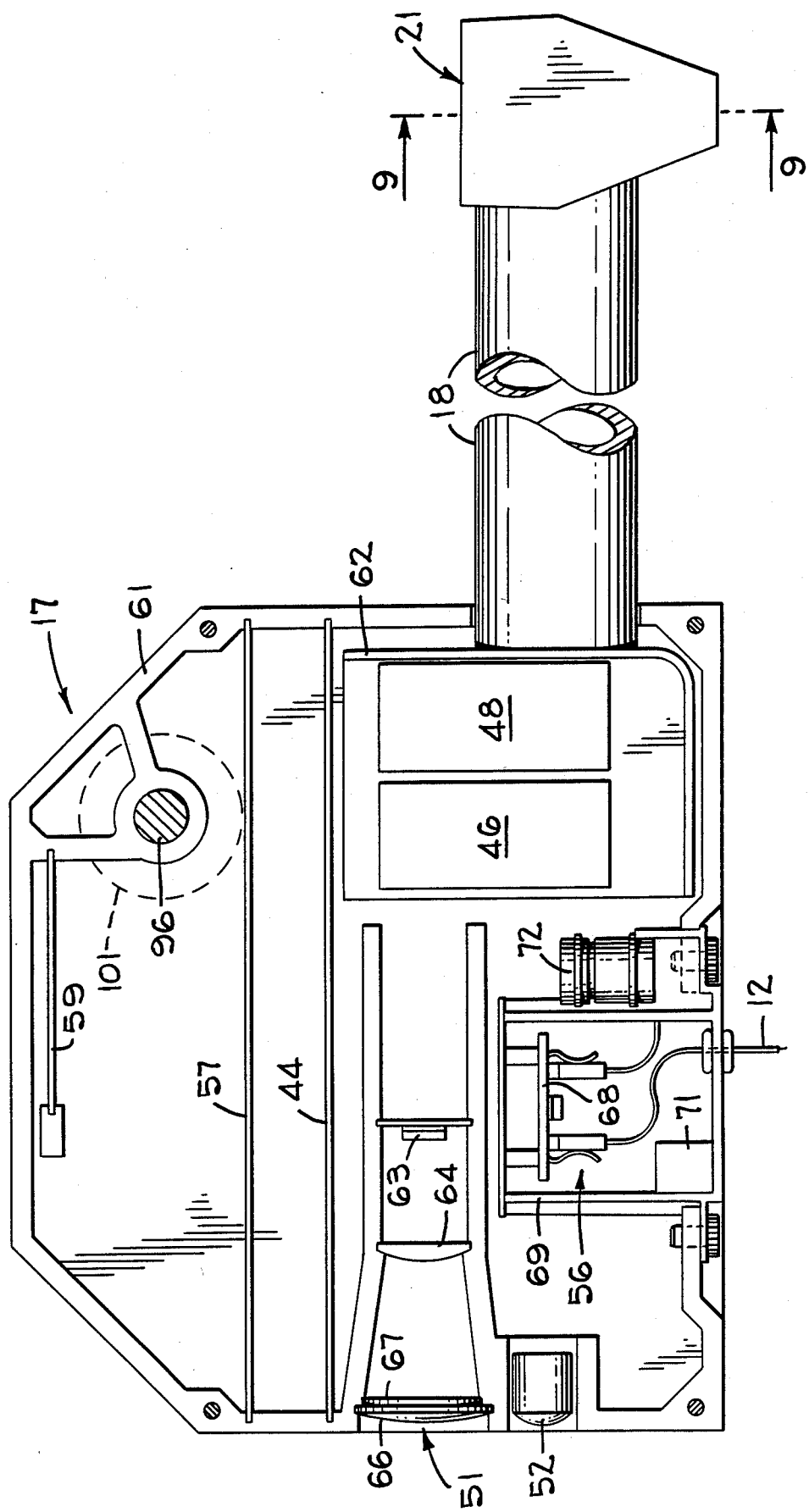

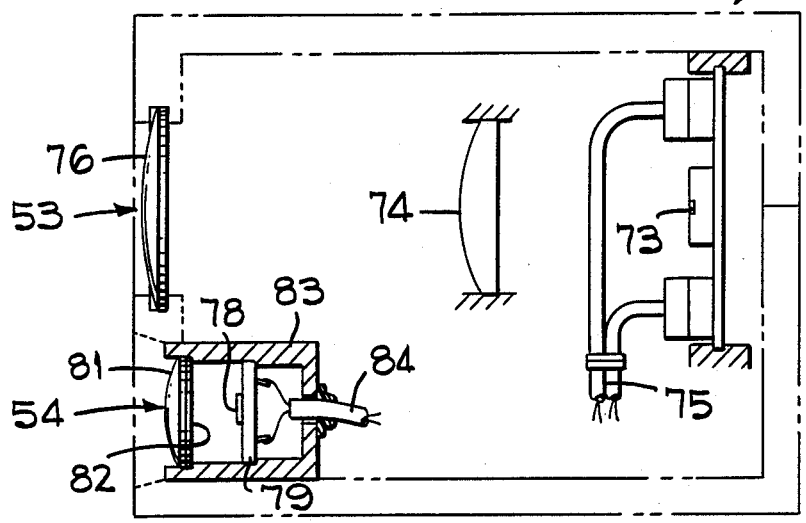
FIG_9
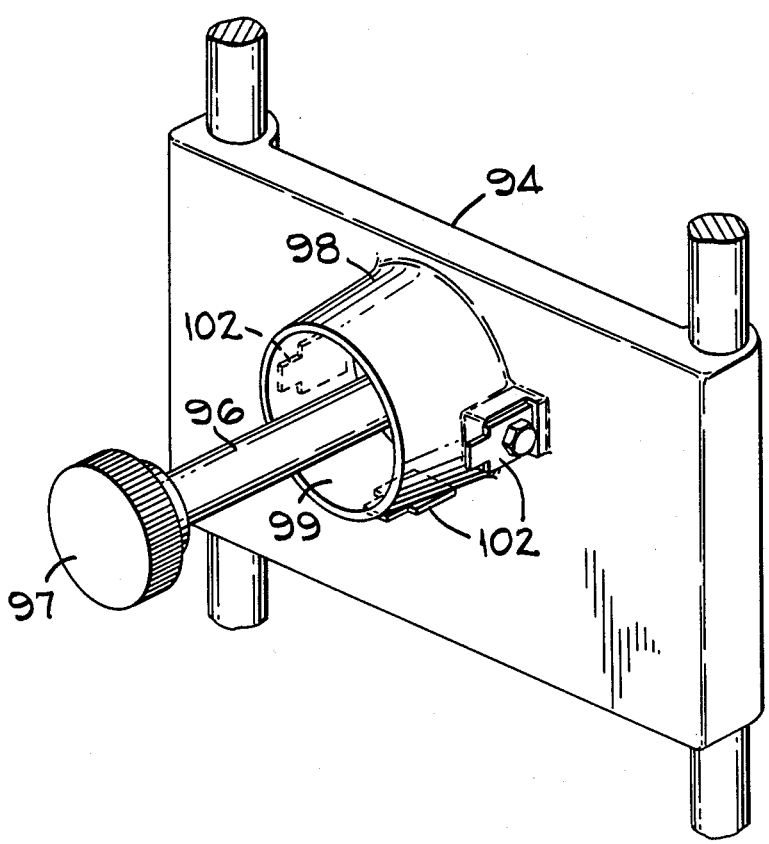
FIG_11

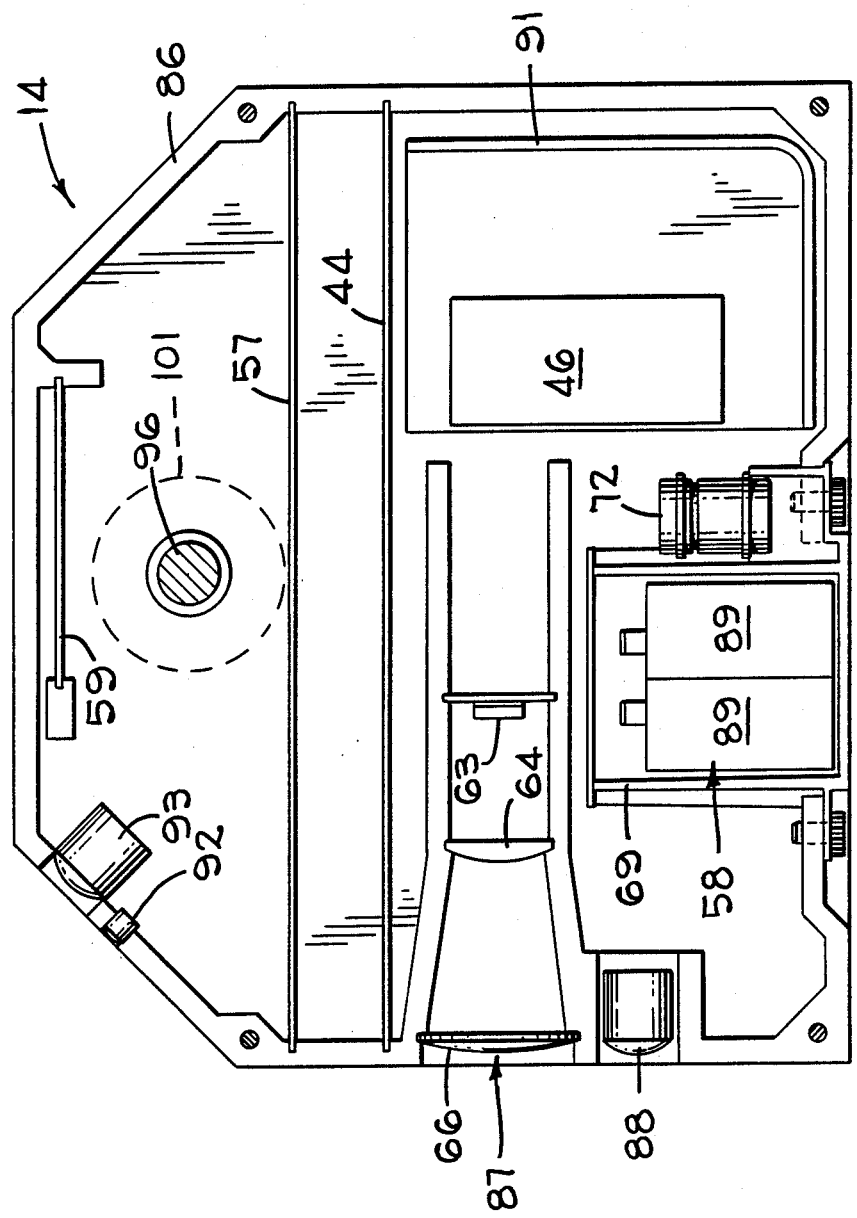

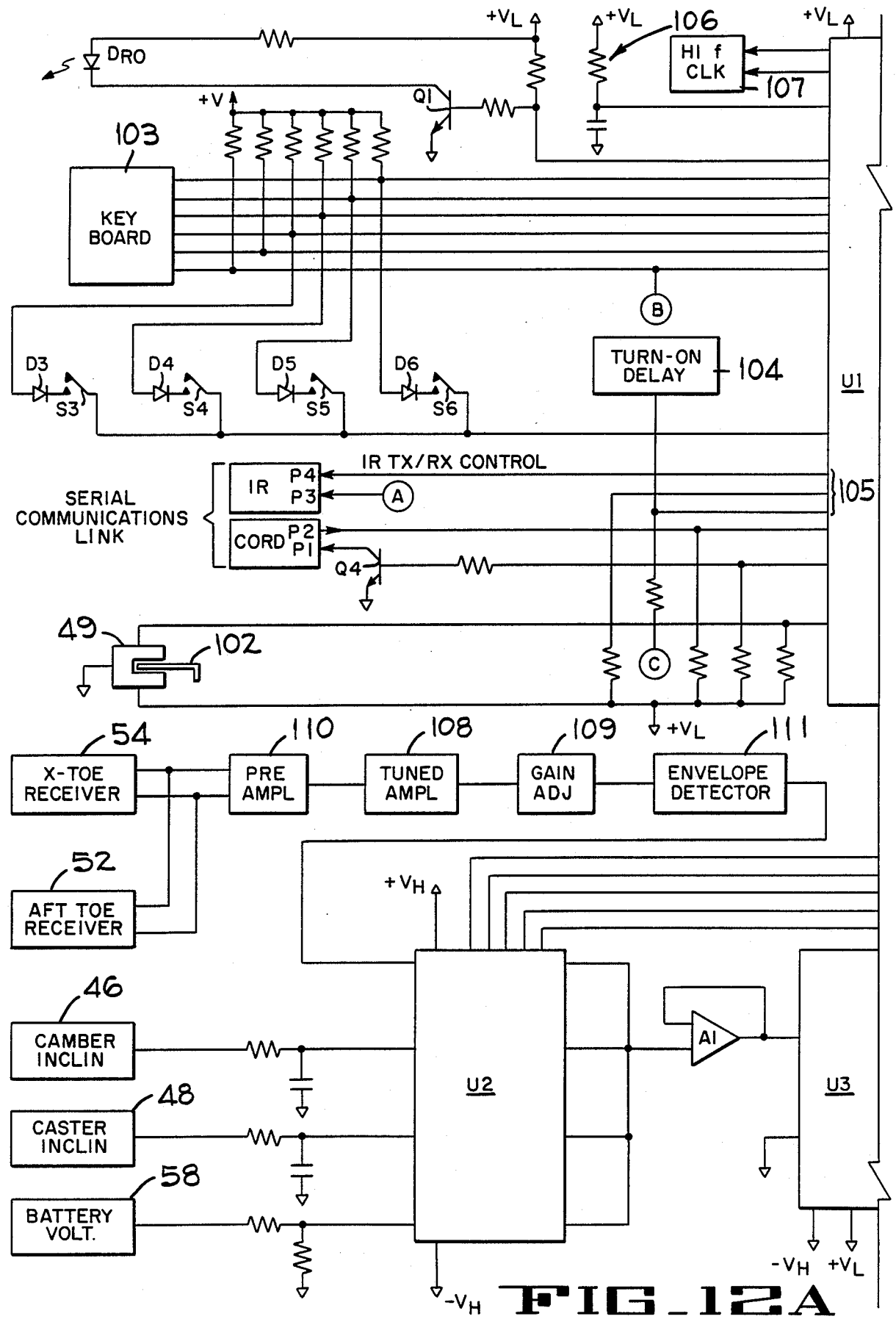
FIG_12A

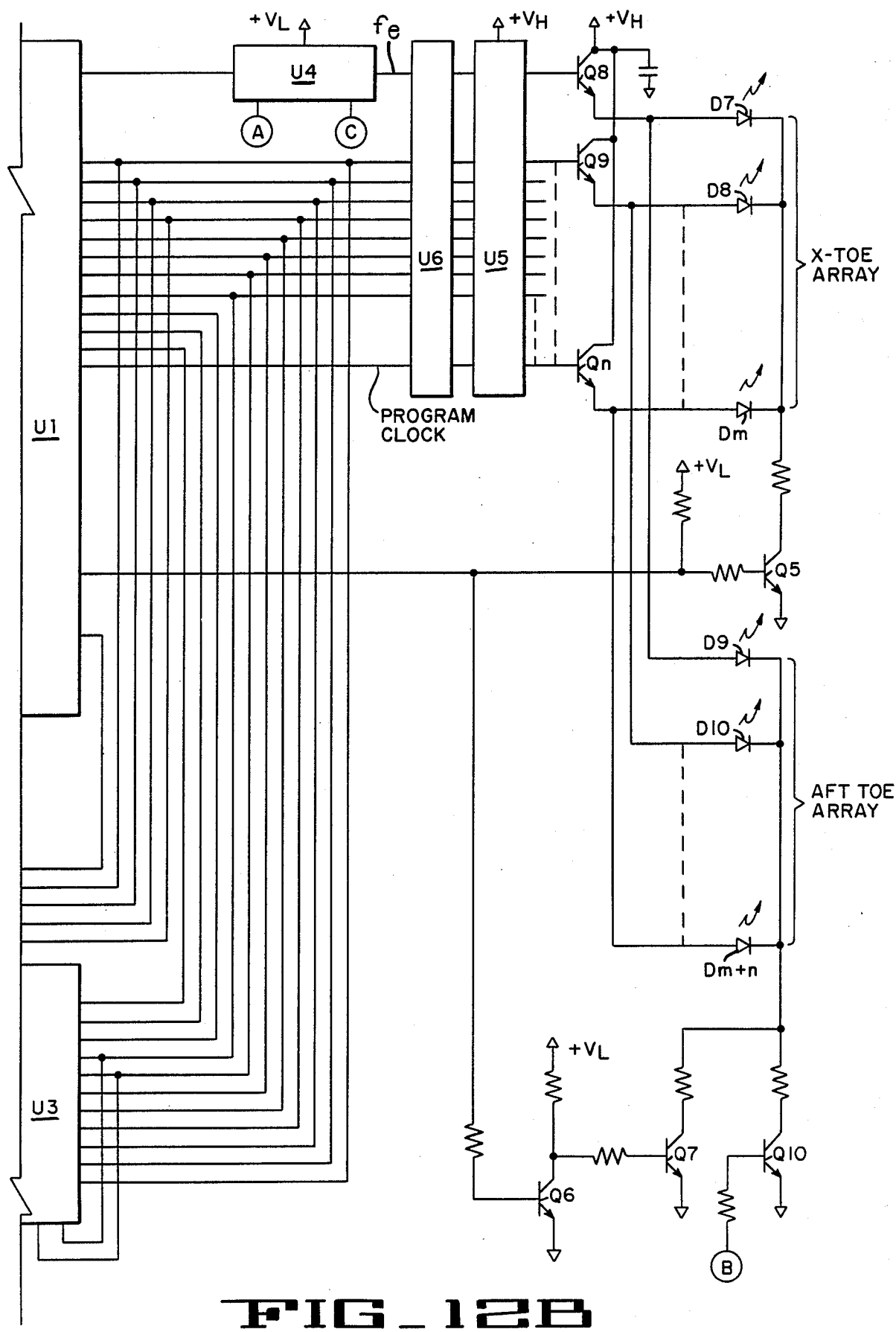
FIG_12B

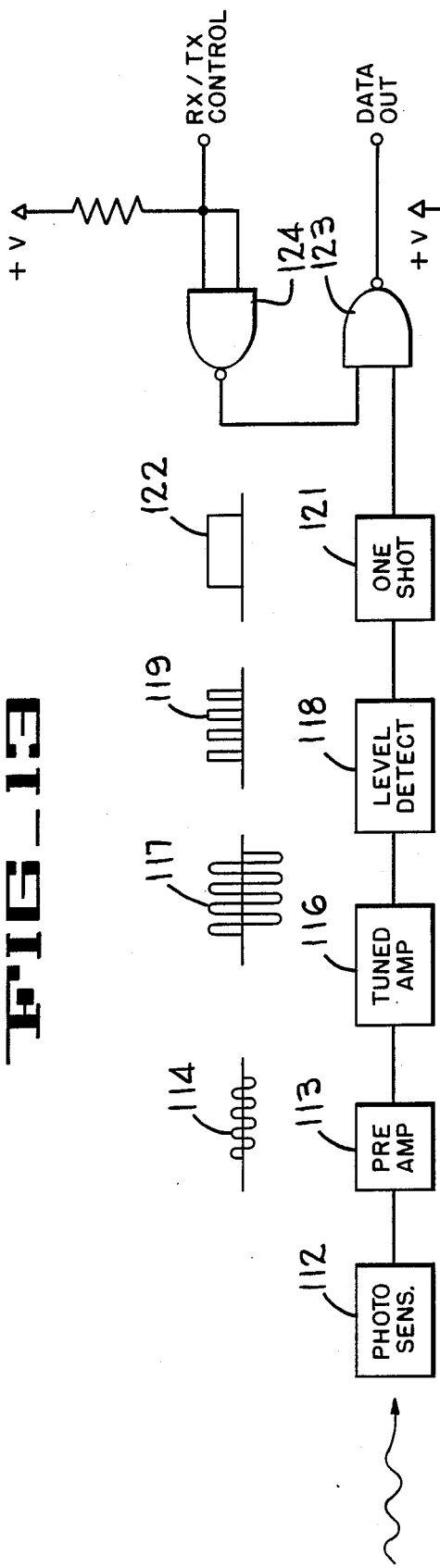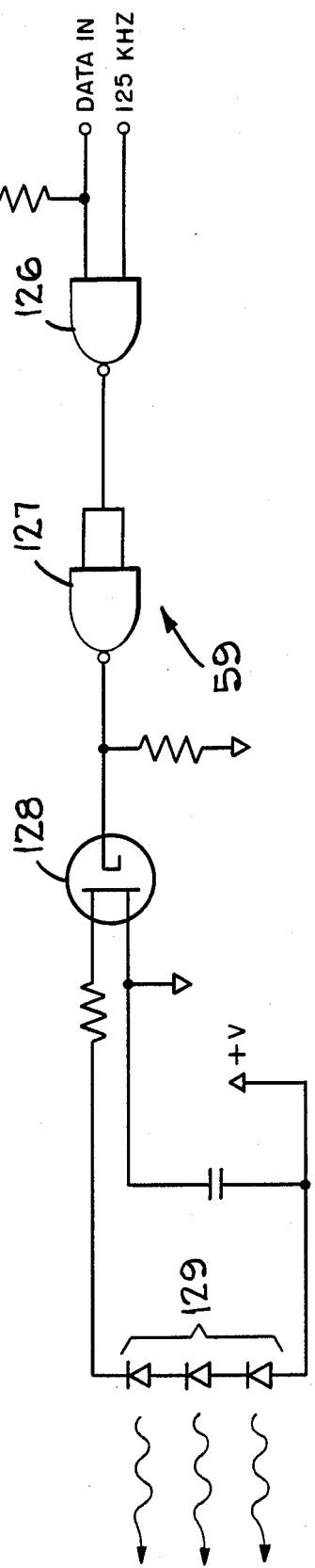
FIG_13
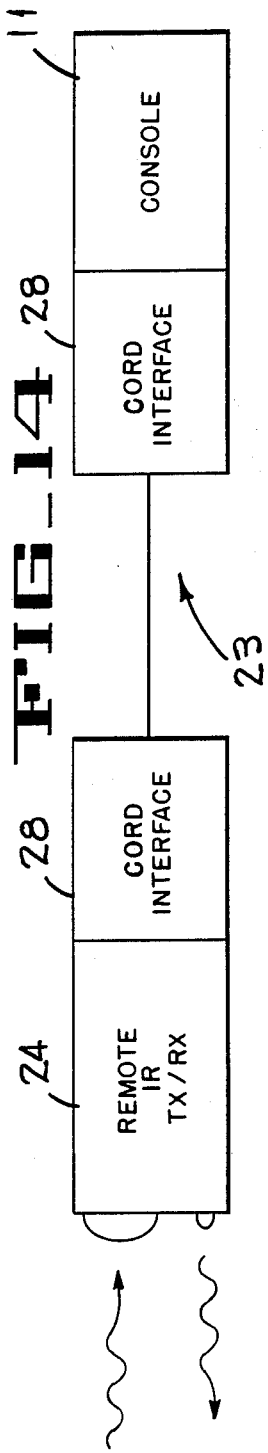
FIG_14

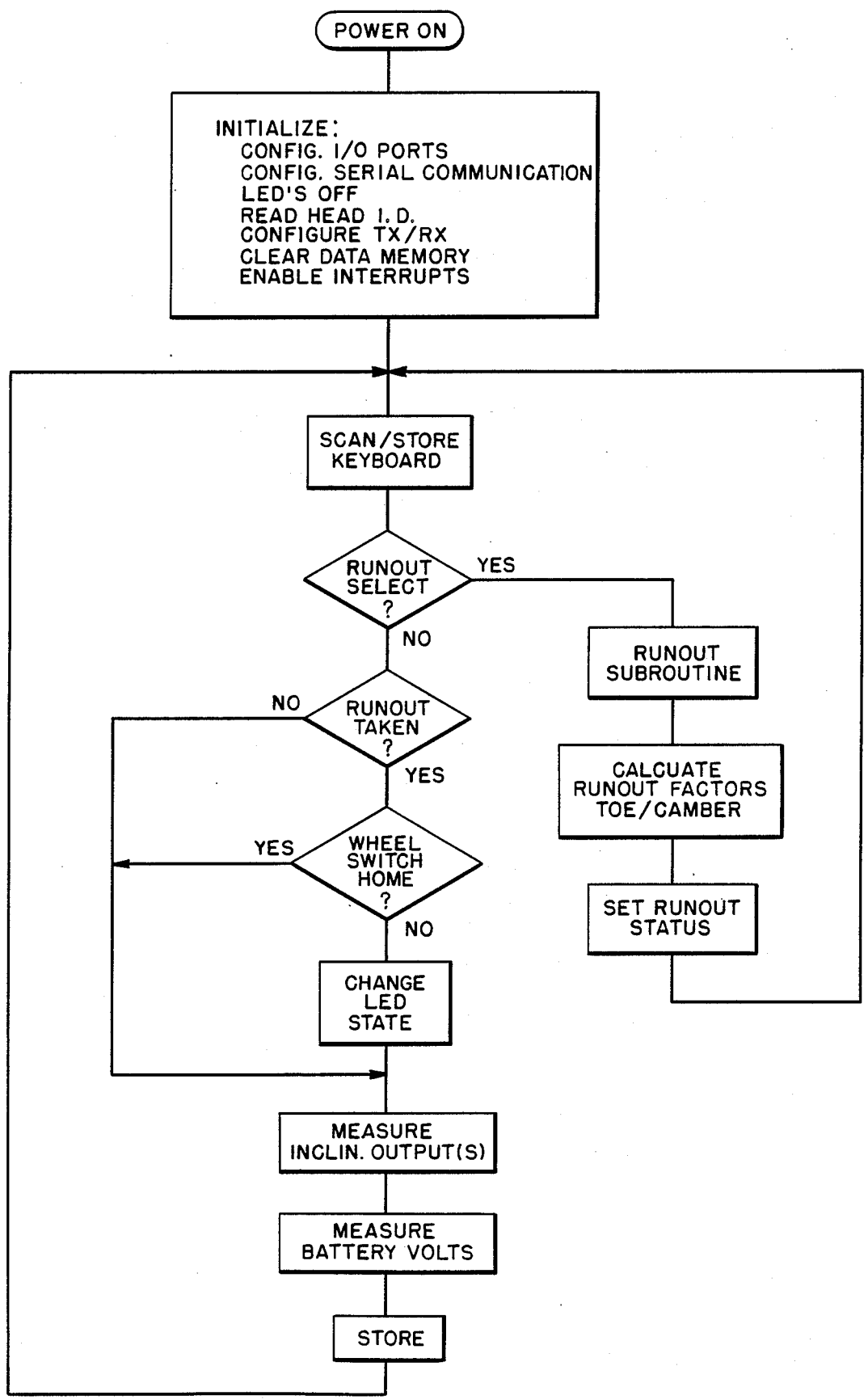
FIG_15A

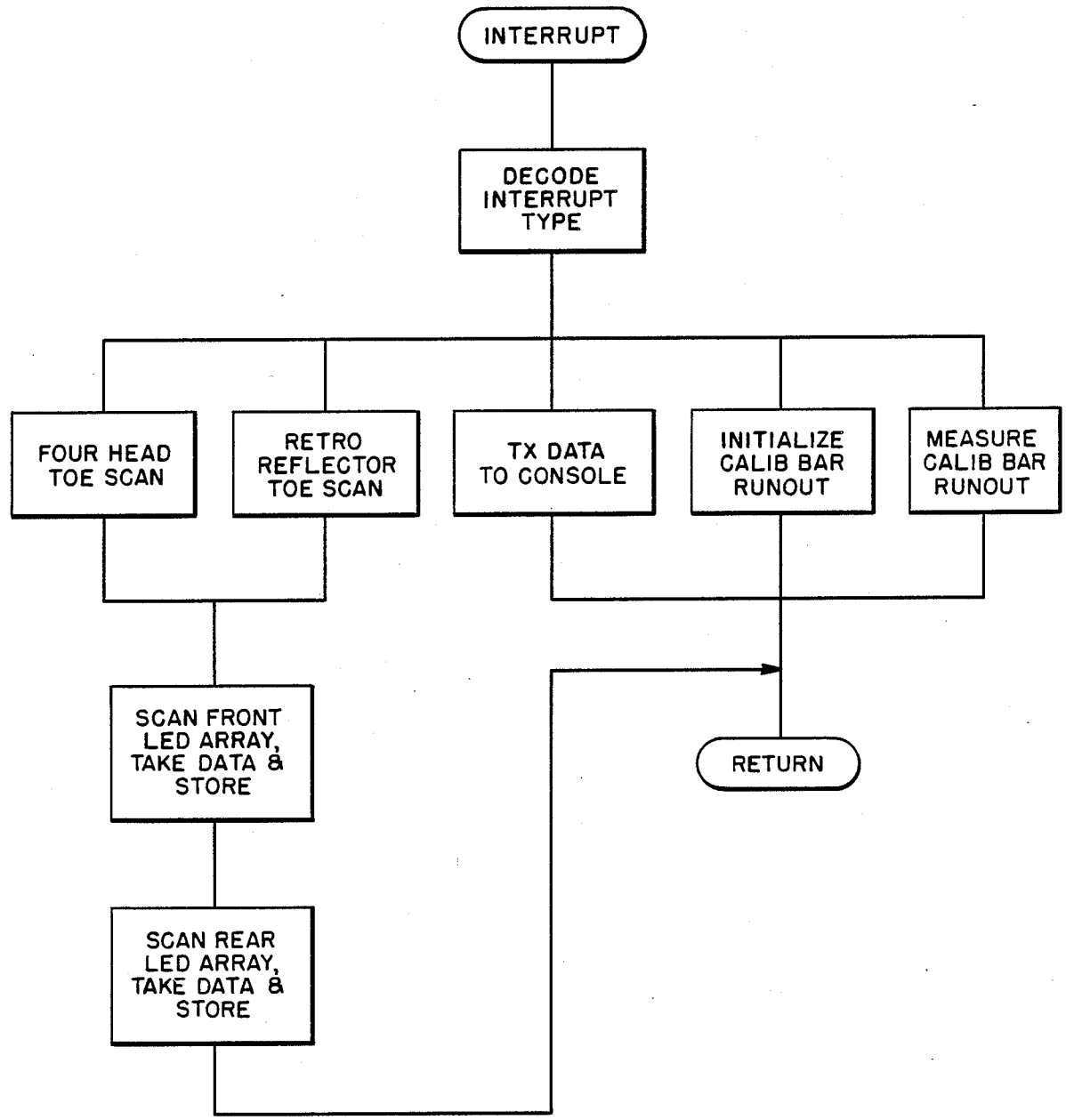
FIG_15B

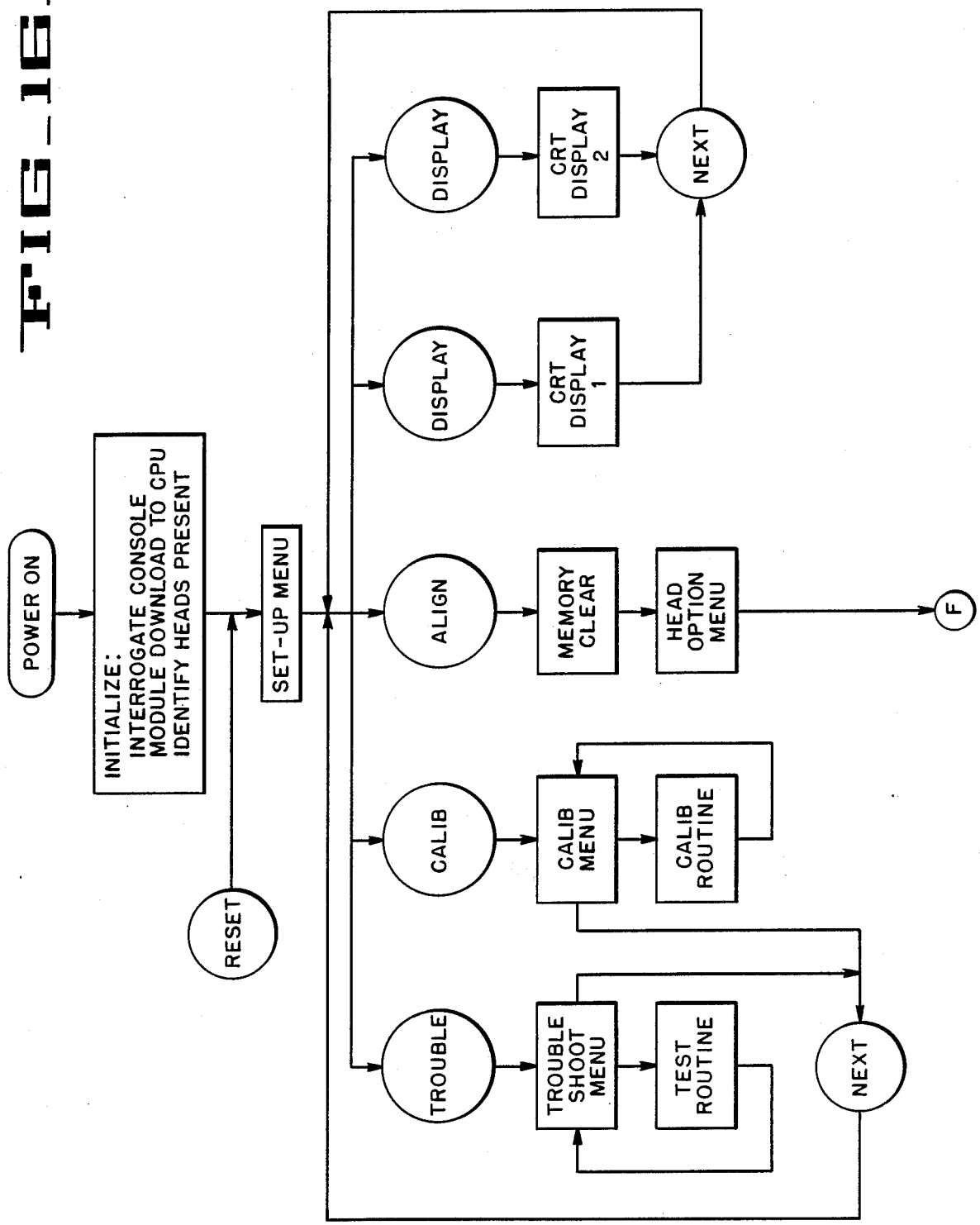
FIG_16A

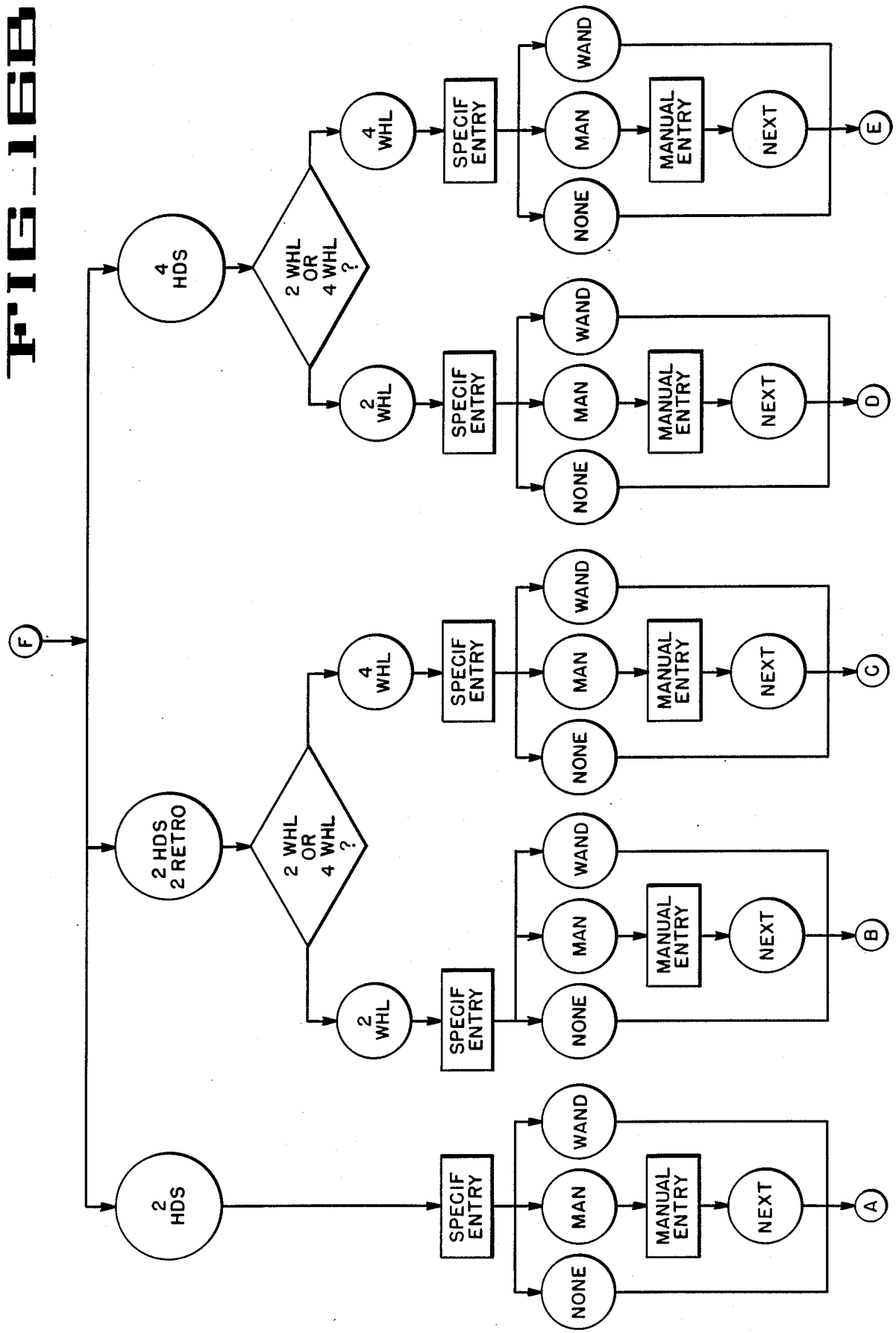
FIG_16B

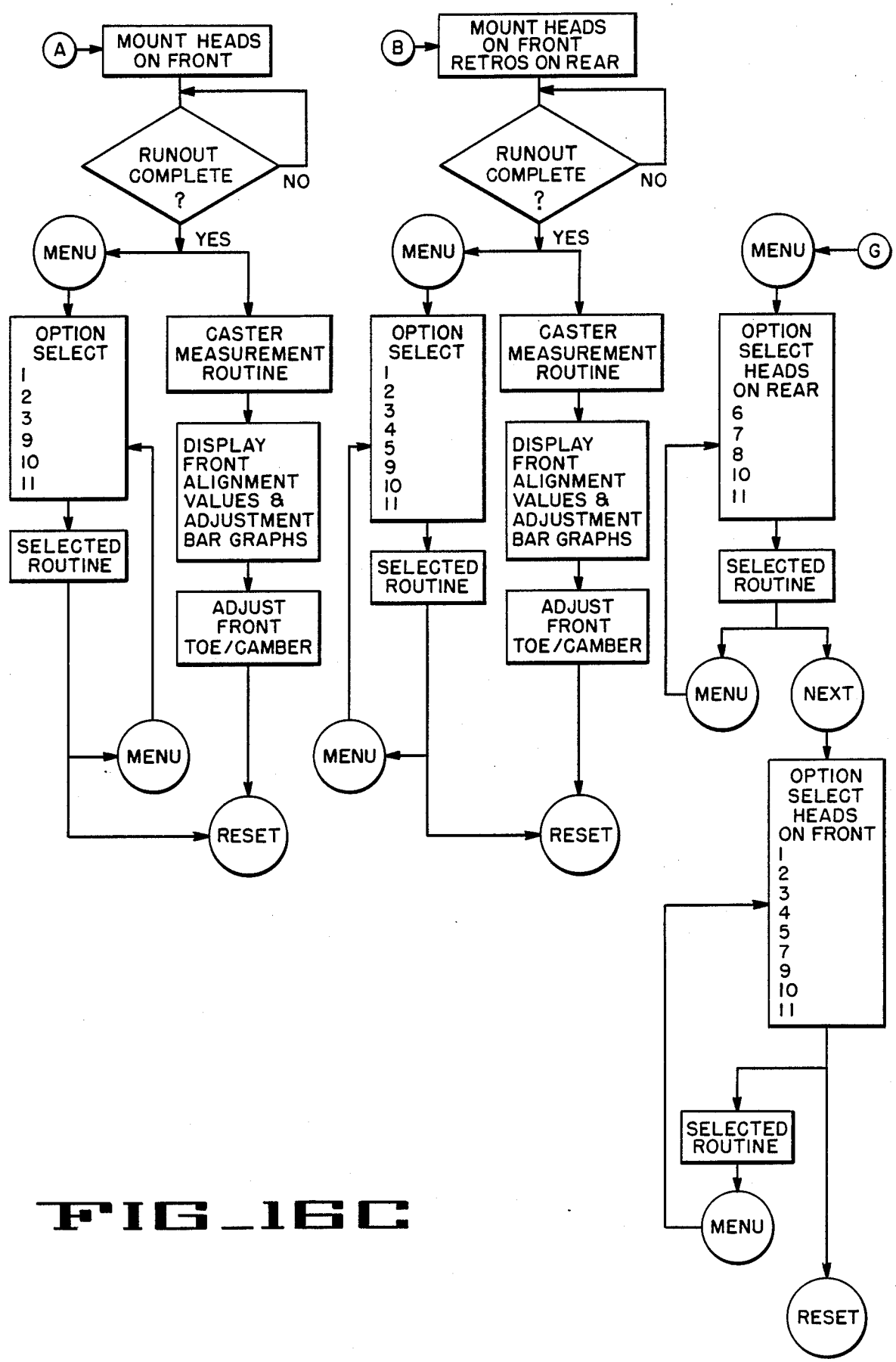
FIG_16C

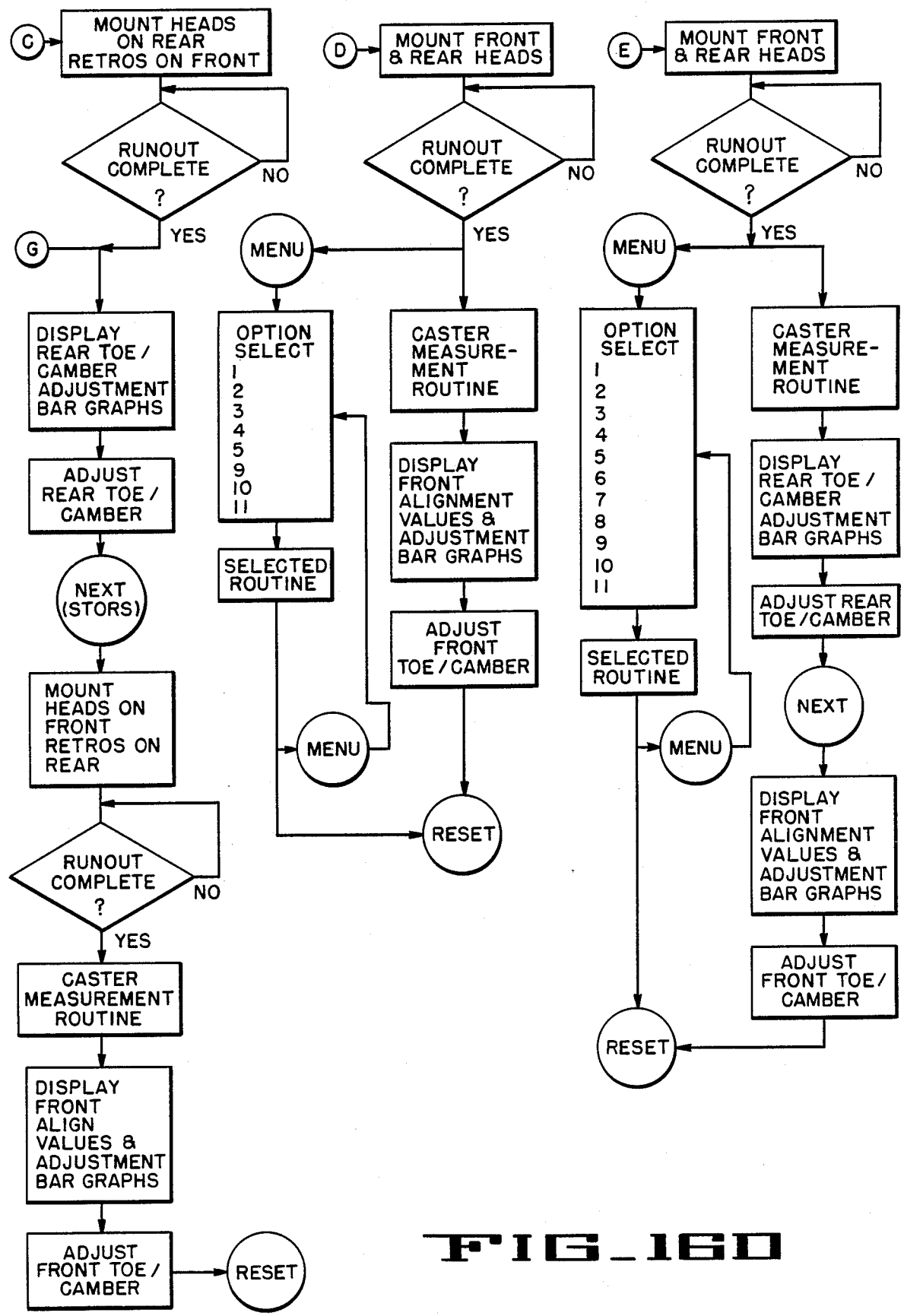
FIG_16D

FIG_17
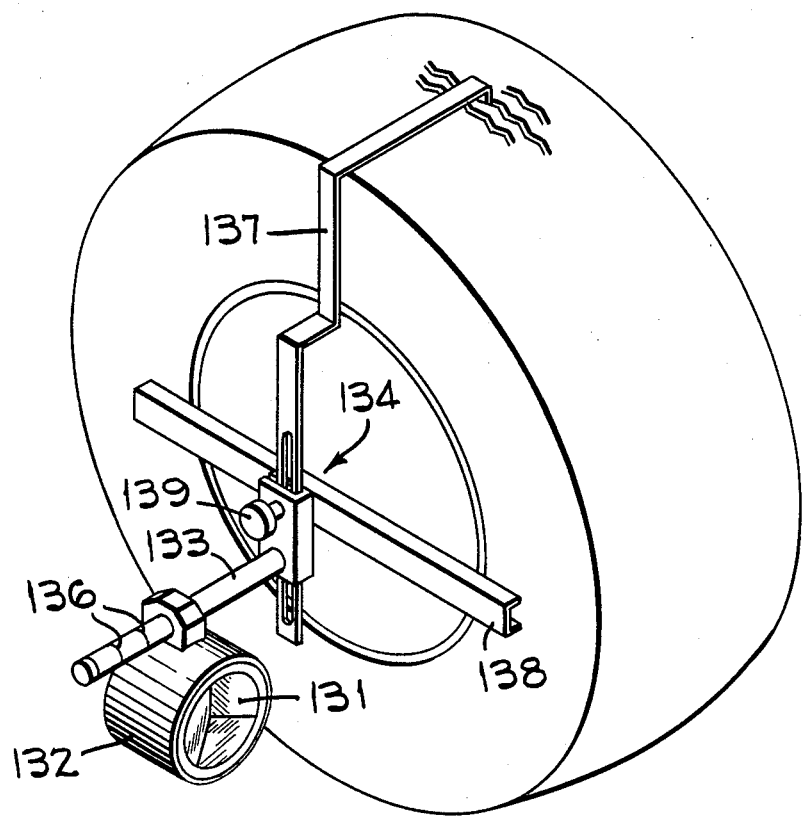

VEHICLE WHEEL ALIGNMENT APPARATUS AND METHOD

BACKGROUND OF THE INVENTION

1. Field of the Invention

The present invention relates to apparatus and method for determining the alignment parameters of the wheels on a four wheeled vehicle, and more particularly to apparatus and method for obtaining such parameters by means of intelligent alignment heads and system modules.

SUMMARY OF THE INVENTION

A dynamically configurable vehicle wheel alignment system is disclosed which includes a plurality of vehicle wheel alignment heads configured to be mounted on vehicle wheels in predetermined orientation relative thereto. A system bus is included and a communication means is coupled between the plurality of alignment heads and the system bus. The system includes at least one system functional means and a functional means control module coupled between each one of the functional means and the system bus. A controller is disposed in each of the functional means control modules and the communications means. Main processor means is coupled to the system bus for providing system calculations and sequencing control and for downloading decision making and communications routines from the functional means controllers. In this fashion the system is configured in accordance with functional means control modules which are present in the system.

A vehicle wheel alignment system is disclosed having alignment heads for mounting on two or more wheels of the vehicle. The system includes a plurality of functional control modules. Controllers are contained in each of the functional control modules and in each of the alignment heads. Main processor means is provided which performs system calculations and operational sequence control and which is coupled to the control module controllers for downloading decision making and communications routines from the functional control modules so that the system is configured in accordance with the functional control modules present in the system.

A vehicle wheel alignment system is disclosed having alignment heads for obtaining wheel alignment data. The alignment heads are configured for mounting on separate ones of a vehicle's wheels. A plurality of functional control modules is included in the system, wherein a controller is disposed in each of the functional control modules and also in each of the alignment heads. The controllers operate to control performance of a dedicated function for each control module in each alignment head. Means is also provided in each of the alignment heads for transmitting and receiving data. Main processor means is coupled to the alignment head and control module controllers for directing serial transmission of data from the alignment heads during separate periods of time.

The method disclosed relates to aligning wheels on a vehicle utilizing an intelligent alignment measuring system having a plurality of wheel mounted alignment heads and a remote console including a main processor and a plurality of functional modules including a communications module. The method includes the steps of initializing the system by downloading digitized decision making and communications instructions from the plurality of functional modules to the main processor. In such a manner the system is automatically configured in accordance with the specific functional modules present in the system. The method further includes the steps of measuring wheel alignment parameters and obtaining head status signals at separate ones of the vehicle wheels and of digitizing the parameter and status measurements to obtain digital alignment data. The digitized data is stored at separate ones of the vehicle wheels and the instructions and digitized data are serially transmitted and received between the communications module and different ones of the alignment heads.

The method disclosed herein further includes the steps of individually controlling each of the functional modules and alignment heads to perform a dedicated function. Wheel alignment and head status are measured at each of the vehicle wheels. The parameter and status measurements are digitized to obtain digital alignment data. The digitized data is stored at separate ones of the vehicle wheels and thereafter serial transmission and reception of instructions and digitized data is undertaken between the communications module and different ones of the alignment heads during separate periods of time.

The apparatus disclosed herein is further directed to a vehicle wheel alignment system having at least two alignment heads which are mountable on the vehicle wheels to be aligned and which contain alignment measurement instruments in at least one of the heads. The measurement instruments provide wheel alignment data. Cordless alignment data transmission means is mounted in at least one alignment head in communication with the alignment measuring instruments. Display means is provided together with cordless alignment data reception means which is coupled to the display means and is in cordless communication with the transmission means. Consequently, alignment data provided by the alignment measuring instruments is shown at the display means.

In another aspect of the invention a wheel alignment system is disclosed comprising a plurality of alignment heads adapted to be mounted on ones of the vehicle wheels in predetermined orientation relative thereto for providing data indicative of wheel alignment characteristics. Means for digitizing the data is provided and a functional control module is also provided which is located remotely from the alignment heads. Cordless transmitting and receiving means operate to communicate the digitized data between the alignment heads and the functional control module.

BRIEF DESCRIPTION OF THE DRAWINGS

FIG. 1 is a mechanical block diagram of one configuration of the alignment system of the present invention.

FIG. 2 is a mechanical block diagram of another embodiment of the alignment system of the present invention.

FIG. 3 is yet another mechanical block diagram of the alignment system of the present invention.

FIG. 4 is a block diagram of the console in the disclosed alignment system.

FIG. 5 is a plan view of the keyboard contained in the console of FIG. 4.

FIG. 6 is a block diagram of the components in a wheel mounted alignment head in the system of the present invention.

FIG. 7 is a plan view of a keyboard on the alignment head of FIG. 6.

FIG. 8 is a side elevation of a front wheel mounted alignment head of the present invention with the cover removed.

FIG. 9 is a section taken along the line 9—9 of FIG. 8.

FIG. 10 is a side elevation of a rear wheel mounted alignment head of the present system with the cover removed.

FIG. 11 is a perspective view of the center mounting bracket on an alignment head wheel clamp used in the present invention.

FIGS. 12A and 12B when taken together form an electrical schematic of the toe board in the alignment heads used in the present invention.

FIG. 13 is a combination block and electrical schematic diagram of the infrared transceiver used in the present invention.

FIG. 14 is a block diagram of a console extension used in one embodiment of the present invention.

FIG. 15A is a flow chart of the alignment head routines managed by the head controllers in the present invention.

FIG. 15B is a flow chart of an interrupt routine occurring during the routine described by the flow chart of FIG. 15A.

FIGS. 16A through 16D when taken together represent a composite flow chart depicting the operational routines and sequences undertaken in the present invention.

FIG. 17 is a perspective view of a wheel mounted retroreflector assembly used in the system of the present invention.

DESCRIPTION OF THE PREFERRED EMBODIMENTS

The block diagram of FIG. 1 shows a system console 11 connected by cords 12a, 12b, 12c, and 12d to separate wheel mounted alignment heads 13 (left front), 14 (left rear), 16 (right rear) and 17 (right front) respectively. It should be noted that the left and right front alignment heads 13 and 17 may be seen to have forwardly projecting booms 18 which are absent from the rear heads. At the outer end of the booms are mounted cross toe projectors as seen at 19 on the left front head and at 21 on the right front head. Infrared transmitters and receivers are included in all four heads and the cross toe projectors. These transmitters and receivers are described in principle in U.S. Pat. No. 4,180,326, issued Dec. 25, 1979 to Andrew K. Chang, and will be described in greater detail hereinafter. The infrared transmission paths are depicted in FIG. 1 by dashed lines with arrowheads indicating the direction of transmission. The infrared receivers are located at the points of impingement of the infrared transmission paths shown in FIG. 1 and will also be described in greater detail hereinafter.

FIG. 2 is an alternative embodiment of the invention described herein, wherein the aforementioned cords 12a through 12d are not present. Such an embodiment may be termed a "cordless" or "wireless" configuration. The transmission and reception between the alignment heads 13, 14, 16 and 17 is accomplished by line of sight infrared transmission and reception between each of the heads and the console 11 as indicated by the dashed line bi-directional arrows 22a, 22b, 22c and 22d respectively. Such transmission and reception could be undertaken in other parts of the electromagnetic spectrum, for example, or could conceivably be in the form of pressure waves in the sonic domain. Infrared or radio frequencies in the electromagnetic spectrum and ultrasonic energy are but examples of appropriate transmission media.

As suggested with respect to FIG. 2, the infrared transmission and reception occurs primarily through line of sight transmission, but can occur when the infrared transmission is intercepted and reflected to the receiver. In most instances predictable reflection of infrared transmissions is unable to be attained. For example, in the embodiment of FIG. 2 where the alignment heads are shown mounted in positions representative of the vehicle wheel positions, it is clear that the vehicle itself would likely interfere with the transmission paths 22a through 22d. Therefore, in a practical sense the embodiment of FIG. 3 is desirable. The console 11 has what is termed a console extension 23 attached to the console at one end and attached to a pair of remote infrared transceivers 24a and 24b at the other end. The remote transceivers are shown as two in number for exemplary purposes only, and are placed to be in communication with one or more of the alignment heads 13, 14, 16 or 17. The transmission of alignment data and instructions may thereby be accomplished between the console and various ones of the alignment heads. The infrared transceivers for the transmission of data as represented by 24a and 24b of FIG. 3 or as mounted within the individual wheel mounted alignment heads as described in conjunction with FIG. 2 will be described in detail hereinafter.

It should be noted that transmission of alignment data and/or instructions may also be accomplished between alignment heads as well as between the console and alignment heads. Such inter-head data communication would depend only on appropriate positioning of the transceivers in the heads, so that data transmitted, when using infrared transmitted energy for example, could traverse paths similar to those shown for measurement energy beam transmissions illustrated in FIG. 1 of the drawings.

FIG. 4 shows the console 11 in block form. A system bus 26 is powered by a power supply 27 which provides power for a number of functional modules to be named individually as well as a cord interface module 28 and the aforementioned remote infrared transceiver 24. A battery charger 29 is disposed within the console for a purpose to be hereinafter explained.

The aforementioned functional modules include a communication module 31 which is interposed between the system bus 26 and either cord interface 28 or infrared transceiver 24. The communications module operates to transmit data in serial form in both directions, toward the system bus and toward the alignment heads which are coupled to the cord interface or the infrared transceiver. A cathode ray tube (CRT) control module 32 is coupled to the system bus. The CRT control operates to drive a CRT display 33. In this fashion data on the system bus may be displayed visually by the CRT under the control of the CRT control. In like fashion a voice control module 34 is disposed between the system bus and one or more voice speakers 36 to provide synthesized voice audio in response to data carried on the system bus.

A printer control module 37 is also coupled to the system bus and to a printer 38 for providing data from the bus in printed form. A bar code reader 39 (in the form of a wand in this embodiment) is provided which is coupled to a bar code reader decoding module 41 so that data may be quickly picked up from a bar code array and delivered to the system bus.

The aforementioned functional communications, CRT control, voice control, printer control and bar code reader decoding modules all include microprocessors as controllers. One such appropriate microprocessor is represented by Motorola MC 6802. A more sophisticated central or main processing unit (CPU) 42 is coupled to the system bus 26. The CPU utilized satisfactorily in this embodiment is represented by Motorola MC 6809 which is a more powerful processor than the controllers in the functional modules, containing calculation capabilities not present in the functional module controllers. The CPU 42 has a keyboard 43 through which manual entry of specifications, instructions, etc. may be made to the CPU and therethrough to the system bus. The array of keyboard selections at the console for manual entry of data into the system is shown in FIG. 5. Reference will be made hereinafter to the specific entry selections during the description of the operating characteristics of the system.

While this particular feature may be alluded to hereinafter in conjunction with the operational description of the system, it is important to note that while the CPU controls the system by performing calculations, manager's tasks, etc., there are particular communications and decision making algorithms or routines included within each of the aforementioned functional modules which are downloaded to non-volatile memory in the CPU 42 upon system initialization so that the CPU thereafter includes added intelligence. Therefore, the CPU's capability to control the sequence of events undertaken by the system, calculation of quantities, etc., is obtained in part from the functional modules during initialization. Thus, the system recognizes all functional modules present in the system by initially obtaining their identity and certain logic sequences, including any special information such as tolerance limits prior to warning messages, etc. A functional module, such as voice control 34, may be inserted or withdrawn from the system without changing the programming in the CPU 42. Nonetheless, each of these functional modules retains its dedicated function; i.e., the CRT controller controls the function of the CRT display when a particular display is required by the CPU 42, or the communications module asks for information from the wheel mounted alignment heads when the CPU 42 indicates to the communication module that it is time to do so. The communication and decision making routines may be downloaded from the functional modules to the CPU 42 in any sequence so that functional modules may be withdrawn and replaced with regard only to the desirable operating characteristics of the system. This capability of the system (the capability of change to suit whatever functional modules are present in the system) is termed dynamic configurability.

The block diagram of FIG. 6 depicts the components included in left or right front wheel mounted alignment heads 13 or 17. A toe circuit 44 is central to the function of the alignment head and includes a microprocessor functioning as a controller for the head. The controller for the head is represented by the single chip Hitachi HD 6301V1. This controller is substantially the same as the aforementioned controllers in the functional modules, except for the single chip construction. Coupled to the toe circuit is a camber inclinometer 46, a steering axis inclination inclinometer 48, and a wheel position sensing Hall effect switch 49. Also coupled to the toe circuit is a rearwardly directed light source projector 51 and a rearwardly looking light source detector 52. A cross directed light source projector 53 and a cross looking light receiver 54 are also connected to the toe circuit 44. While the rear and cross projectors are transmitters and receivers substantially as described in the aforementioned U.S. Pat. No. 4,180,326, some description of their structure as seen in the present invention will be undertaken hereinafter.

A cord interface 56, similar in most respects to the cord interface 28 of FIGS. 4 and 14 is coupled between the toe circuit 44 and the console 11. The cord interface includes circuitry which elevates the signal from the alignment head from logic level to a cable driver level (i.e., from 5 volts to 12 volts) for transmission along the cable 12. A head power supply 57 is included in each alignment head, and receives its excitation through the cable 12 and the cord interface 56. The power supply in turn powers the cord interface and the toe circuit 44.

The wheel mounted alignment heads as shown in FIG. 6 have alternative configurations. In the configuration described immediately hereinbefore, transmission and reception by the head is accomplished over the cable 12. In the alternative head configuration the cord interface 56 and the cable 12 are replaced by a battery pack 58 which energizes the power supply 57 as shown by dashed line in FIG. 6. The power supply 57 energizes not only the toe circuit 44 but also an infrared transceiver 59 which is substantially the same as the remote infrared transceivers 24a and 24b of FIG. 3. As described hereinbefore, the infrared transceiver 59 must be either in line of sight transmission and reception orientation with the console 11 or appropriate infrared transmission reflection must be provided so that the infrared signals are successfully passed between the wheel mounted alignment heads and the console. It should be noted that while FIG. 6 specifically describes the block diagram depicting either of the front alignment heads 13 or 17, FIG. 6 also represents a block diagram of either of the rear heads 14 or 16 when the cross projector and cross looking receiver 53 and 54 and the steering axis inclination inclinometer 48 are deleted. It should further be noted that when an alignment head is in what is termed the battery mode (cord interface 56 and cable 12 are removed and battery pack 58 added with infrared transceiver 59 energized), the battery packs 58 from each alignment head should be connected to the battery charger 29 as seen in FIG. 4 when the system is not in use.

With reference to FIG. 8 of the drawings the structural aspects of the right front alignment head 17 will be described. It is to be understood that the left front alignment head 13 is a mirror image of the alignment head 17. A case or support shell 61 is shown. A cover which mates with the case 61 is not shown, but when installed completely encloses the contents of the case with the boom tube 18 (previously mentioned) extending therefrom. The infrared transceiver 59 is shown in the form of a circuit board supported within the case. The power supply 57 and toe circuit 44 are also shown as circuit boards firmly mounted within the case. A bracket 62 is secured within the case, upon which is welded the boom tube 18 as well as the camber inclinometer 46 and the steering axis inclination inclinometer 48. A rearwardly directed array of infrared light emitting diodes 63 is shown projecting infrared or light energy toward a cylindrical lens 64. The array of LED's is about twenty to thirty in number and describes a line which is generally horizontally disposed in a direction in and out of the plane of FIG. 8. As a consequence, the cylindrical lens 64 causes LED light dispersion in a substantially vertically disposed direction. The light from the cylindrical lens is projected toward a plano-convex lens 66 which functions to focus the vertically dispersed light as light stripes within the range of vehicle wheel bases for which the alignment system is designed, and therefore to focus the stripes at approximately the distance occupied by a rear wheel mounted alignment head receiver. It should further be noted that a pair of prisms 67 is attached to the planar side of lens 66 in the fashion shown in U.S. Pat. No. 4,130,362 issued Dec. 19, 1978 to Melvin H. Lill et al (see FIGS. 7 and 8 thereof). As recited therein, the prisms 67 function to obtain a ten degree beam deflection of the LED light stripes. The prisms 67 therefore have a deviating or refracting power of ten degrees to thereby form vertical beams identical to the beams which pass through the center of the plano-convex lens 66 except that they are deflected ten degrees from the beam passing through the plano-convex lens alone. In this fashion a vertical light stripe pattern may be projected about a centerline extending substantially straight rearwardly from the wheel mounted alignment head as well as two additional patterns arrayed about centerlines substantially ten degrees to either side of the central array. The two additional angularly disposed arrays are used in determining front wheel steering angle in the processes to be described hereinafter and are not generated in the rear wheel mounted alignment heads. The assembly of items 63, 64, 67 and 66 (and appropriate mounting and adjustment structure) constitutes the rearwardly directed infrared light transmitter 51. The case 61 of the front wheel mounted alignment head 17 also includes support structure for the rearward looking infrared receiver 52 so that reflected light from transmitter 51 or light transmitted from a rear mounted alignment head may be received thereby.

FIG. 8 shows the configuration of the cord interface 56, wherein a circuit board 68 carries the aforementioned circuit components which transform the head data from a logic level to a cable driver level and the cable delivered data from a cable drive level to a logic level. A cord interface circuitry is enclosed in a detachable module 69 which includes a ballast weight 71 (if necessary for achieving head leveling) and has a plug 2 which mates with a plug delivering cord power to the power supply 57 and data to the toe circuit 44. The cord 12 may be seen exiting from the cord interface module enclosure 69.

The cross toe transceiver 21 is shown on the end of the boom tube 18 in FIG. 8 and is shown in cross section in FIG. 9. The infrared light transmitter and receiver in the cross toe transceiver is substantially the same construction as the rearwardly projecting transmitter 51 and the rearwardly looking receiver 52 of FIG. 8. An LED array 73 of from twenty to thirty infrared light emitting diodes is disposed in fixed position near the rear wall of the cross toe transceiver and is oriented in a substantially horizontal position extending in and out of the plane of FIG. 9. The LED's in the array are illuminated in predetermined sequence as described in the aforementioned U.S. Pat. No. 4,180,326 and are passed through a cylindrical lens 74 and a plano-convex lens 76 for the purposes recited hereinbefore for the similar structure of transmitter 51. The optical positioning between the LED array, cylindrical lens and plano-convex lens is such as to cause the substantially vertical light stripes to focus at distances within the range of vehicle track widths for which the system is designed. Leads extend from the toe circuit board through the boom tube 18 to the LED array 73 as shown at 75 and carry the signals which sequentially illuminate the LED's in the array to obtain the angle measurement described in the previously mentioned U.S. Pat. No. 4,180,326.

As may also be seen in FIG. 9, cross toe transceiver 21 includes an infrared light receiver 54 which, as mentioned hereinbefore is substantially the same as the receiver 52 of FIG. 8. A photocell 78 is disposed on a circuit board 79 at the focal length of a light collecting plano-convex lens 81. A red filter 82 is disposed behind the plano-convex lens to assist in reducing ambient light noise. The circuit board, photocell, filter and plano-convex lens are disposed in predetermined positions within a photocell case 83 from which signal leads 84 extend in sealed fashion. The photocell is thereby protected from the surrounding environment. The cross toe projector or transceiver 19 on the left front wheel mounted alignment head 13 is a mirror image (not shown) of the cross toe projector 21 seen in FIG. 9.

FIG. 10 shows the configuration of the rear wheel mounted alignment heads 14 and 16 with the cover removed as explained in the description of the front heads in FIG. 8. The alignment head of FIG. 10 happens to be the left rear wheel mounted head 14. A rear head case or support structure 86 is shown which provides support for the infrared transceiver circuit 59 shown in the form of a printed circuit board. In a fashion similar to that shown in FIG. 8 for describing the front wheel mounted alignment head the power supply 57 and toe circuit 44 are disposed on circuit boards fixed within the case 86 as shown. A forwardly projecting infrared light transmitter 87 is shown which includes the light emitting diode array 63, the cylindrical lens 64 and the plano-convex lens 66 disposed as described for the rearwardly projecting transmitter 51 of FIG. 8. Infrared light projected from the rearward looking projector of the left front wheel mounted projector 51 is received by the forward looking infrared light receiver 88 which is substantially the same as receivers 52 and 54 hereinbefore described.

It should be noted that in FIG. 10 the left rear mounted head is shown containing the battery pack 58, mentioned hereinbefore in conjunction with FIG. 6, which is contained in the same enclosure 69 as described for enclosing the cord interface 56 in FIG. 8. The battery pack contains a pair of six volt batteries 89 in this embodiment which are connected in series to energize the various circuits within the alignment head. As described for the cord interface package, the enclosure 69 is quickly removable from the bottom of the case 86 and has the aforementioned plug 72 attached thereto which mates with the case mounted plug to deliver the twelve volts DC to the power supply board 57. Further, a bracket 91 which corresponds to bracket 62 in the front head description in FIG. 8, is mounted within the case 86. Another camber plane oriented inclinometer 46 is mounted on the bracket 91 so that rear wheel camber data may be obtained.

An infrared transmitter array, which may consist of several infrared emitting diodes 92 (to obtain an acceptably large cone of infrared light transmission) is shown mounted in one of the diagonal faces of the case 86.

Adjacent to the LED transmitter is an infrared receiver 93 which is substantially the same as the infrared receivers 52, 54 and 88 described hereinbefore. It should be noted in the rearmost diagonal surface of the case 61 in the front wheel mounted alignment head 17 at FIG. 8, but is only shown here in FIG. 10 to reduce the complexity of the drawings. The transceiver represented by items 92 and 93 is intended to communicate with the transceivers 24a or 24b shown in FIG. 3 or, in certain controlled circumstances, with a similar transceiver located in the console 11 as shown in FIG. 1.

FIG. 11 shows a center sliding mounting bracket 94 on a wheel clamp as described in U.S. Pat. No. 4,285,136, issued Aug. 25, 1981 to Marshall Reagan, wherein the sliding bracket is modified for use with the alignment heads described herein. The wheel clamp has a shaft 96 extending therefrom having a threaded free end (not shown in detail) which is engaged by a knurled nut 97. A boss 98 projects from the sliding bracket 94 having a conical inner surface 99. The shaft 96 acts as the pivotal support for the wheel mounted alignment heads of FIGS. 8 and 10. A conical projection 101 extends from the rear side of the cases 61 and 86 having an external surface thereon which normally only slidably engages the conical inside surface 99 on the center bracket 94. The heads may be locked rotationally by turning the knurled nut 97 on the shaft threads to draw it tightly against the aforementioned outside covers which mate with the cases 61 and 86 and thereby force the outer conical surface on projections 101 into tight frictional engagement with the inner conical surface 99 on the wheel clamp center bracket. Also shown in FIG. 11 are three metal tabs 102 which are mounted ninety degrees apart around the boss 98 as shown. The tabs serve to actuate the Hall effect wheel position switch 49 when the wheel is rotated for runout measurement taken as described in either of U.S. Pat. No. 4,138,825 issued Feb. 13, 1979 to Pelta or U.S. Pat. No. 4,180,915 issued Jan. 1, 1980 to Lill et al. The Hall effect switch 49 is mounted on the rear surface of the cases 61 and 86 of the front and rear alignment heads respectively at a radius from the bore which accepts the pivot shaft 96 which is substantially the same as the distance from the axis of the shaft to the position of the metallic tabs 102.

Turning now to the electrical schematic of FIGS. 12A and 12B the circuitry of the toe board in each of the wheel alignment heads is depicted. A keyboard 103 is in communication with a microprocessor U1. The layout of the keyboard 103 is shown in FIG. 7. When power is turned on the microprocessor or controller U1 is prevented from starting by being held at reset by the RC circuit 106. At the point where RC circuit 106 allows the processor to start, the processor mode is set in accordance with the states set at the pins 105 on the controller U1. After mode is set a turn on delay 104 releases one of the mode set pins 105 for use as the clock in the serial communications link. A high frequency clock 107 provides a frequency to the microprocessor, a fraction of which is coupled to a modulator U4. The modulator provides an LED excitation frequency to a level translator U6 which elevates the logic level to plus twelve volts A logic signal is also received by the level translator and passed to a line decoder U5 which selects the various LED drivers Q8 through Qn for driving the cross toe LED array (item 73 in FIG. 9) D7 through Dm in front wheel mounted alignment heads. The LED array D7 through Dm also represents the forwardly projecting LED array (item 63 in FIG. 10) in rear wheel mounted heads. LED's D7 through Dm are energized by turning on transistor Q5 with a high signal from controller U1.

The LED drivers Q8 through Qn also drive LED's D9 through Dm+n in the rearwardly directed LED array (item 63 in FIG. 8) in front wheel mounted alignment heads. The rearwardly directed LED array D9 through Dm+n is energized by turning on a pair of transistors Q10 and Q7 connected in parallel to raise the current level through the last mentioned array of LED's. The parallel pair Q10 and Q7 is used because the D9 through Dm+n array must project infrared energy over a longer distance than the cross toe array.

Transistor Q10 is turned on by a high signal provided by the controller at the point indicated by B in FIG. 12B. Transistor Q7 is turned on at the same time by a low signal from controller U1 at the base of transistor Q6 which generates a high signal at the base of transistor Q7. Since the bases of transistors Q5 and Q6 are connected, it may thus be seen that transistor Q5 which energizes the cross toe LED array is energized alternatively with the parallel combination of transistors Q7 and Q10.

The item numbers used hereinbefore for the front mounted heads will be used in FIG. 12A, it being understood that the description of FIG. 12A holds for the rear mounted heads with regard to those components which are included in the rear mounted heads. The cross toe receiver and track toe or rearwardly looking receiver 52 provide signals which are processed through a preamplifier 110, a tuned amplifier 108, a gain adjustment circuit 109 and an envelope detector 111 which acts as a rectifier and filter for the received toe signals. The processed toe signal is delivered to an analog switch U2. The signals from the camber inclinometer 46 and the caster or steering angle inclination inclinometer 48 are also coupled to the analog switch U2. A battery voltage signal is coupled to the analog switch when the battery pack 58 is inserted in a head and the infrared transceiver module 59 is in operation. The analog switch delivers one of the four inputs to an analog to digital converter U3 as directed by the controller U1. The measured quantity is digitized and coupled to the controller. Digitized data may be stored by the controller. The digitized data, which is obtained and stored in parallel, is thereafter transmitted serially at a fraction of the clock frequency C obtained from modulator U4. Transmission occurs under the control of the communications module 31 (FIG. 4). The main processor 42 is coupled to the alignment head controllers through the communications mode for directing serial transmission of data from the alignment heads during separate periods of time. This means that the heads transmit their stored data alternately during a time as directed by the main processor.

When the alignment head is operating in a "cord pack mode" serial data is transmitted to the serial communications link terminal P1 for transmission to the console 11 through a transistor Q4. Serial data is received at the controller U1 from the console through the communications link terminal P2 in the cord pack mode as shown.

When the alignment head is in the infrared transceiver mode, the controller U1 of FIG. 12A produces an infrared transmit-receive control signal to the IR circuit 59 through terminal P4 at the IR serial communications link. A one hundred twenty-five kilohertz carrier frequency for data to be transmitted is provided to the IR circuit 59 by the modulator U4 at A to the IR transmission mode serial communications link terminal P3.

The head identification is determined by manually setting switches S5 and S6 (FIG. 12A). The four heads are identified separately by the different switch states 00, 01, 10 and 11. The head identification is used by the heads to determine when data should be received for action or transmitted.

The wheel position switch 49 is shown on FIG. 12A with one of the metallic tabs 102 disposed therein. The passage of the metallic tab through the slot in the Hall effect switch serves to actuate the switch and to indicate that the wheel upon which the alignment head has been mounted has attained a particular position.

Turning now to FIG. 13 the infrared transceiver circuit in the infrared transceiver 59 in the wheel alignment heads will now be described. This description also serves for the infrared transceiver circuits 24a or 24b of FIG. 3 with slight modification to be mentioned later. The transceiver circuit includes a photosensor or light sensing receiver 112 which is substantially the same as receivers 52, 54, 88 and 93 hereinbefore described. The received photosensor signal is introduced to a preamplifier 113 which provides a signal appearing approximately as seen at 114 in FIG. 13. Note that the receiver bit is represented by a pulse train at the data carrier frequency. The output of the preamplifier is coupled to a tuned amplifier 116 providing an output such as indicated at 117. The output of the tuned amplifier is submitted to a level detector 118, providing an output 119 which is coupled to a one-shot generator 121 having an output pulse dwell time longer than one half the carrier period. A data pulse indicated at 122 is thereby provided by the one-shot generator which is passed through a NAND gate 123 controlled by a receive/transmit control gate 124. The gate 124 is controlled by the alignment head controller U1 (FIG. 12A) so that reception of data is suppressed during data transmission by the head.

Data is prepared for transmission by the IR transceiver by mixing the data and the aforementioned 125 KHz carrier frequency in a NAND gate 126, inverting the modulated data in a series connected NAND gate 127 and coupling the inverted output to the gate of a field effect transistor 128. The field effect transistor is connected to drive a trio of infrared light emitting diodes 129 simultaneously to thereby transmit the data in the form of infrared pulse trains of bit duration increments. As mentioned hereinbefore the transmitter LED's 129 may be more than one in number to provide an acceptable cone of radiation for assurance of reception at the intended receiver considering the distance and the position of the receiver relative to the transmitter.

FIG. 14 depicts the console extension shown in FIG. 3, consisting of the cord 23 extending between the console 11 and a remote infrared transceiver 24. At both the console and the remote transceiver ends of the cord 23, cord interface circuits 28 are placed. As described hereinbefore, the cord interface circuits convert logic level signals to cord driver levels for transmission along the cord and then convert the cord driver signal levels to logic levels again for delivery to the console or to the remote infrared transceiver from the cord. The remote infrared transceiver 24 (representing transceivers 24a and 24b of FIG. 3) shown in FIG. 14 is the same as the transceiver 59 shown in FIG. 13 except that the modulation takes place in the cord interface 28 attached to console 11.

With reference now to FIG. 15A a flow chart is shown which illustrates the operation of the head as it is controlled by the microprocessor U1 (FIGS. 12A and 12B). The head is always in this loop unless the runout switch is selected or the routine is interrupted by the console communications controller. Power is turned on at the head and the controller or microprocessor mode is set and the input/output ports are configured together with serial communications configuration as described in conjunction with the description of the schematic of FIGS. 12A and 12B. The head identification is read from switches S5 and S6. Data memory is cleared and interrupts are enabled. The routine is initiated by a scan and storage of keyboard selections. If runout is selected at the keyboard 103 on the head then the runout subroutine is entered. Runout is obtained by placing the wheel clamp at the eleven o'clock position prior to selecting runout at the keyboard. The wheel is then rotated counterclockwise to twelve o'clock and stopped. The wheel is then set down. During the foregoing process the three metallic tabs or vanes 102 located ninety degrees apart on the wheel center sliding bracket 94 pass through the Hall effect switch causing three switch actuations. When the third vane 102 is positioned within the Hall effect switch the runout LED goes out. This is an indicator to the operator that the runout calculation with the wheel set down in that rotational position will provide valid runout correction data.

After the runout subroutine is performed, runout factors for both toe and camber are calculated by the head controller U1. Runout status is set and the keyboard and keyboard selections are once again scanned and stored. If runout has not been selected the routine requires a check of runout status to see if runout has been taken. If runout has been taken then the controller checks to see if the wheel switch 49 is "home". As described hereinbefore, that alludes to whether or not the switch 49 has a tab 102 disposed adjacent thereto which indicates that the wheel is in the aforementioned set-down position. If it is not, the LED will change state and repeated running of this routine will cause the LED to appear to be flashing, thereby giving the aforementioned warning to the system operator that runout correction is likely to cause alignment data to be in error. If the wheel switch is in the proper position at wheel setdown, the LED will remain extinguished and the routine will proceed to measure the inclinometer outputs (camber and steering axis inclination in front heads and camber only in rear heads) and battery voltage and to store the measurements. The routine then returns to the beginning to scan and store keyboard selections. When data is required by the main processing unit 42 (CPU of FIG. 4), the stored information is converted from parallel to serial form and transmitted as hereinbefore described.

In FIG. 15B the various interrupt routines are depicted which are entered at any time during the routine of FIG. 15A as controlled by the communications module 31 of FIG. 4. When an interrupt is transmitted by the communications module, the head decodes it to determine interrupt type. If the system has been placed in the calibration phase, as hereinafter described, the calibration bar runout initialization interrupt routine is undertaken which sets runout angle switch sensing count to zero and performs other initialization functions. As calibration bar runout steps are performed, data relating thereto is measured during a "measure calibration bar runout" interrupt. The measurements are stored and sent to the communications module during a "transmit" interrupt.

The remaining two interrupts of FIG. 15B are imposed on the head routine of FIG. 15A when either four head toe scan or two heads with retroreflectors toe scan is required by the communications module 31. In such cases the front and then the rear LED arrays are scanned and data is taken and stored in the heads.

The alignment data to which reference has previously been made, is taken in parallel and stored in controller memory. The data is transmitted in serial format as hereinbefore described from head memory to the communications module 31 during the "transmit data" interrupt of FIG. 15B.

With reference to FIG. 17 a retroreflector assembly having a retroreflecting surface 131 is shown supported in a case 132 rotationally mounted on a shaft 133 extending from an adjustable wheel support framework 134. There are a number of axially spaced grooves 136 on the shaft in which the support case 132 may be positioned to laterally align the retroreflector with a projected infrared beam. The support frame 134 is of a usual type including a tire engaging arm 137 and a cross arm 138, all of which may be locked in adjusted position by a knurled nut 139 to afford vertical alignment of the surface 131 with a projected beam. A pair of the retroreflector assemblies of FIG. 17 may be used with a pair of alignment heads in a manner to be hereinafter described to obtain two or four wheel alignment measurements.

Referring now to FIGS. 16A through D a description of system operation options and procedural flow for those options will be described. Certain procedural steps will require entry at the keyboard 43 shown in FIG. 5 for the console 11 and entries at the keyboard 103 of FIG. 7 which is on each alignment head. The functions "next" and "print" may be selected for the system at any alignment head or the console. The selection "voice" may be selected for the system at any alignment head. Selection of the "reset" function at any time in the procedures to be described, returns program control to set-up in FIG. 16A.

Power is turned on at the console and the configuration of the console is interrogated at initialization as seen in FIG. 16A. After a "roll call" is conducted by the main processing unit 42 the communications and decision making portions from the functional modules which are present are downloaded in any sequence to the CPU 42 as hereinbefore described. Further, the wheel mounted alignment heads which are present in the system are identified to the console by means of the switch settings S5 and S6 (FIG. 12A) in the heads. A set-up menu is presented at the CRT display which provides for a choice of five selections. A troubleshoot routine may be selected which provides a troubleshooting list. According to selection from the troubleshooting list a display of system configuration may be provided, a verification of communications between system components may be displayed, or raw sensor data may be displayed. If a sample bar code array is provided and the corresponding code is contained in the main processing unit memory, the sample array may be scanned by the bar code reader wand and a confirmation of bar code reader veracity may be obtained. Calibration factors for the alignment head measurement instruments may be displayed or a display may be had of the CRT characters. After each troubleshooting test routine a return is made to the trouble shoot menu. The "next" key may then be selected to recall the set-up menu.

One of the aforementioned five set-up selections is a calibrate selection. When the calibrate selection is selected, a choice of six calibration routines is provided.
1. Cross toe.
2. Track toe.
3. Inclinometers.
4. Units of measurement.
5. Operator identification/date.
6. Change advertising message.

The calibrate routines 4, 5 and 6 above require inputs at the console keyboard. The cross toe calibration routine No. 1 requires a calibrating bar assembly upon which a pair of front wheel mountable heads are placed. The heads are levelled. The runout procedure is provided for the bar and the cross toe readings are entered and stored in nonvolatile memory as correction or calibration factors for display and calculations.

The track toe calibration routine No. 2 requires mounting a front or rear head on the right or left front wheel as applicable and placement of the other head of that pair in the beam path for the mounted head. The reading on the front is placed in memory and the head is inverted. The track toe reading for the front mounted head while inverted is also placed in memory and the average of the two readings is stored in nonvolatile memory as track toe correction for that head.

When the inclinometer calibrate routine No. 3 is selected a head pair is mounted on the calibration bar, the bar is levelled and an indication must be made at the console as to which head pair is mounted, front or rear. Runout is performed, the heads are leveled and the inclinometer values are stored in memory as zero reference values.

Two of the remaining three set-up menu selections are simply CRT display selections, one of which may be changed by calibrate routine No. 6 wherein changes are selected at the console keyboard 43.

When the align selection on the set-up menu is selected, memory in the CPU assigned to alignment data is cleared, and a head option menu appears (FIG. 16B) which relates to the number of alignment heads or heads and retroreflectors intended to be used. The head options include a system including four heads, two heads with two retroreflectors or two heads alone. The alignment head combination options break down to the use of two front heads 13 and 17 on the front wheels and two rear heads 14 and 16 on the rear wheels (four heads), two front heads 13 and 17 with two retroreflector assemblies as seen in FIG. 17 or the two front heads 13 and 17 by themselves.

By way of first investigating the procedural flow with reference to the selection of four heads for vehicle wheel alignment, reference is made to FIGS. 16B and 16C. As seen in FIG. 16B, once the selection of the four head system is made a subsequent selection of two wheel or four wheel alignment must be made. Presuming the four wheel alignment selection is then made, the system requires the entry of specifications for the vehicle whose wheels are being aligned. Specifications may be entered through the use of the bar code reader 39 (FIG. 4), which may be in the form of a wand. Alternatively, the specifications may be manually entered through the console keyboard 43 (FIG. 5). It is necessary after manual entry of specifications to select "next"

to proceed through the remainder of the alignment. In the event no specifications are available and the bar code reader is not included in the system, it may be desirable to enter no specifications at all. A selection for "none" is thereby made, wherein all measurements are displayed numerically, but without indication of tolerance. The foregoing describes the specification entry routine and will be hereinafter referred to as such where required in the description of the other alignment options.

After specification entry the procedure advances to a point where the system instructs the operator to mount the front and rear alignment heads on their respective vehicle wheels. The procedure will not be allowed to continue until runout as discussed in conjunction with FIG. 15 hereinbefore has been accomplished. As shown in FIG. 16D if runout is not completed the system is locked in that position until completed.

Having completed the runout routine the system will normally proceed to an alignment sequence which will obtain alignment data for all four vehicle wheels as seen in the far right column depending from "runout complete" in FIG. 16D. Alternatively, by selecting "menu" at the console keyboard 43 (FIG. 5) a number of options for alignment may be selected. The currently available option selections are as listed in Table I.

TABLE I
1. Measure caster.
2. Measure caster change.
3. Measure caster/camber change.
4. Measure SAI and included angle.
5. Measure front set back.
6. Measure rear set back.
7. Measure thrust angle (RRD).
8. Measure rear camber and toe.
9. Measure front camber and toe and display tester (statically).
10. Display all alignment measurements taken.
11. Specifications.

Once having selected one of the alignment options listed in Table I, an appropriate sequence of operations will be displayed on the CRT 33 to accomplish the selected option. Having completed the displayed procedure or having decided to discontinue the selected option, in most cases an additional option may be selected from Table I by actuating the "menu" key on the console keyboard 43 once again. Otherwise the optional routines may be exited by selecting "reset" on the console keyboard which returns the routine to the set-up point in FIG. 16A.

After completion of runout for the four head/four wheel alignment selection, if the optional routines are not selected, the usual alignment procedures include first undertaking the caster measurement routine for the two front steerable wheels. Caster measurements in the system of the present invention are initiated by actuating the "caster" switch (FIG. 7) on the appropriate front alignment head keyboard 103. Caster angle measurement procedures are recited in the aforementioned U.S. Pat. No. 4,130,362 wherein it is explained that the front wheels of a vehicle are first turned into a straight ahead position and thereafter turned first ten degrees in one direction and then ten degrees in the opposite direction. The camber inclinometer 46 (FIG. 8) is used to provide signals used in the calculation of caster, wherein such signals are obtained at each of the right and left ten degree turn positions. Adjustment of caster at the front wheels is accomplished by locking the brake on the front wheel and rotationally locking the head on the same front wheel by tightening the knurled nut 97 (FIG. 11) and thereafter sensing caster change by sensing the output of the steering axis inclination inclinometer 48 (FIG. 8) in the front heads.

Thereafter rear toe and camber adjustment bar graphs and values are provided on the CRT display and rear toe and camber may be adjusted. The bar graphs are configured to indicate attainment of the vehicle specifications through bar alignment on the CRT and change of bar color from red to green when measured toe and camber are within specification limits. A "next" selection is made at the console keyboard 43 (FIG. 5) or any of the alignment head keyboards 103 (FIG. 7). The CRT displays front alignment values and adjustment bar graphs. Front toe and camber may thereafter be adjusted with the bar graphs responding as described for the adjustment of rear toe and camber. Front camber and toe values are displayed together with the bar graph displays. After front adjustment, which is undertaken relative to the rear wheel rolling direction or thrust line utilizing the rear wheel alignment data, the four wheel alignment is completed and "reset" is selected at the console keyboard to return the routines to the reset or set-up point shown in FIG. 16A.

Presuming two wheel alignment is selected by the operator with four heads mounted on the wheels, the specification entry routine described hereinbefore for the four wheel measurement is undertaken as seen in FIG. 16B and the procedure progresses to point D of FIG. 16D. The front and rear alignment heads are mounted and the process is blocked from proceeding further until runout is completed as hereinbefore described. Once runout is completed the usual two wheel alignment process shown is entered unless "menu" is selected at the console keyboard. In the latter instance options 1 through 5 and 9 through 11 of Table I are provided at the display for selection. Once an option is selected a routine for carrying out that option is provided and procedural steps are shown on the CRT display. Upon completion of the selected routine the options available for this procedure may be reviewed by selecting the "menu" key at the console keyboard. Alternatively, the two wheel alignment routine may be exited by selecting "reset" which returns the routine to the reset or set-up point in FIG. 16A.

In the two wheel alignment procedures using four alignment heads, if the options are not selected, the normal routine proceeds as follows. The caster measurement routine as described hereinbefore in conjunction with the four wheel/four head measurements is undertaken. The front alignment values and adjustment bar graphs are displayed on the CRT. Adjustment of the front toe and camber is undertaken while viewing the current alignment values and relative positions and colors of the bar graphs. With front caster, toe and camber measured and adjusted, the front wheel alignment routine using the four alignment heads is completed and "reset" is selected at the console keyboard which returns the routine to "reset" in FIG. 16A.

Proceeding now to the selection of the alignment option utilizing two alignment heads and two retroreflectors, as seen in FIG. 16B, it should be noted that the two alignment heads used are the left and right front alignment heads 13 and 17 (FIG. 8) together with a pair of retroflector assemblies as seen in FIG. 17. Having selected this alignment option, the system must be informed as to whether a two wheel or a four wheel alignment is desired. Presuming for the moment that four wheel alignment is required, the aforementioned specification entry routine is conducted and the process proceeds to point C in FIG. 16D. Initially the right front alignment head is mounted on the left rear wheel so that the cross toe projector is directed across the back of the rear wheels. The left front alignment head is mounted in like fashion on the right rear wheel. A retroreflector assembly is mounted on each of the front wheels so that the retroreflector surfaces 131 intercept the track toe beam projection (as shown by beam transmitter 51 of FIG. 8). The runout routine is entered, requiring completion before the process may proceed as hereinbefore described. Once runout is completed the routine reaches a point wherein optional alignment procedures may be selected by proceeding to G in FIG. 16C and actuating the "menu" switch at the console keyboard 43. Presuming the optional routines are selected, options 6, 7, 8, 10 and 11 as seen in Table I are available while the alignment heads 13 and 17 are mounted on the vehicle rear wheels as seen in FIG. 16C. As described hereinbefore, an appropriate optional alignment routine is selected. Following completion of the routine or in the event a different available optional routine is desired, the options may be recalled by selecting the "menu" key at the console keyboard. Otherwise, the switch selection "next" is made and certain options are provided which may only be undertaken with the alignment heads 13 and 17 mounted on their respective front wheels. These options include options 1 through 5, 7 and 9 through 11 as shown in Table I and as seen in FIG. 16C. Following completion of the selected routine, a return may be made to the options available with the heads mounted on the front wheels by selection of "menu" at the console keyboard or the "reset" switch may be actuated to return the routine to "reset" as seen in FIG. 16A.

In the event selection of four wheel alignment is made using two heads and two retroreflectors and the optional selections are not made, the normal procedures following completion of runout are as seen on FIG. 16D beginning at G. With the heads 13 and 17 mounted on the rear wheels and the retroreflector assemblies of FIG. 17 mounted on the front wheels, rear toe and camber values are displayed together with the rear toe and camber adjustment bar graphs. Adjustment to rear toe and camber may be undertaken with reference to the displayed alignment values and bar graphs as hereinbefore described. Following satisfactory adjustment and indication of rear wheel toe and camber, the "next" switch is selected at the console keyboard 43 or any of the head keyboards 103 and the rear values are thereby placed in storage. The alignment heads 13 and 17 are then mounted on the front wheels and the retroreflector assemblies of FIG. 17 are mounted on the rear wheels. The runout routine must be undertaken at this point for the front wheels before the alignment is allowed to proceed. Caster measurement is undertaken as hereinbefore described followed by a display of the front alignment values and the front alignment adjustment bar graphs. Front toe and camber are adjusted with reference to the displayed front alignment values and bar graphs and the routine is exited and returned to set-up in FIG. 16A by selecting the "reset" switch at the console keyboard.

When the alignment option head utilizing two heads and two retroreflectors is selected followed by the measurement option requiring alignment for two wheels only (front wheels), the specification entry routine hereinbefore described is undertaken as shown in FIG. 16B and the process advances to B in FIG. 16C. As hereinbefore described the two alignment heads used in this alignment procedure are front alignment heads 13 and 17 and the two retroreflectors are assemblies represented in FIG. 17. The alignment heads 13 and 17 are mounted on the left and right front wheels respectively with the retroreflector assemblies mounted on the rear wheels in a position to intercept the track toe beam projections as described hereinbefore for the four wheel alignment using two heads and two retroreflectors. Once again runout selection and completion is required prior to the system allowing the alignment to proceed. Following completion of runout, the optional selections for alignment for this routine may be called up by actuating the "menu" switch at the console keyboard. FIG. 16C shows that routines 1 through 5 and 9 through 11 of Table I are available as options. A selected routine is called up as a consequence of option selection and return to the available option list may be commanded by selection of the "menu" switch before or after completion of the selected routine. Alternatively, "reset" may be selected at the console keyboard which returns the routine to "reset" and the set-up condition seen in FIG. 16A.

The remaining alignment option involving two heads as seen in FIG. 16B may be selected wherein alignment information is obtained for the two front wheels only. The specification entry routine as hereinbefore described is undertaken and the routine proceeds to A in FIG. 16C. The alignment heads used in this procedure are the front wheel alignment heads 13 and 17 which are mounted on the front wheels. The aforementioned runout routine must be selected and completed before the routine may proceed. Once runout is completed the option listing for two head alignment may be called up by a selection of the "menu" switch on the console keyboard. Such selection makes available options 1 through 3 and 9 through 11 of Table I as seen in FIG. 16C. After selection of the appropriate routine, the routine may be completed and the optional listing called up again on the CRT by selection of the "menu" switch. Alternatively, if the selected routine is no longer desired, in most cases the option listing may be called up again without completing the selected routine. When the available options are no longer required, the procedure is returned to "reset" in FIG. 16A by actuation of the "reset" key at the console keyboard.

Following runout completion in the two front wheel mounted head alignment option, the normal alignment procedures for this head configuration may be undertaken by avoiding the selection of the optional routines and proceeding with the front wheel caster measurement routine following selection of the "caster" switch on the head keyboard 103 and the caster measurement procedures hereinbefore described. Front alignment values and adjustment bar graphs are displayed. Adjustment of the front wheel toe and camber may then be made while referring to the displayed front alignment values and the toe and camber bar graph positions and colors as already described. Once front wheel alignment characteristics have been measured and adjusted, the routine may be exited by actuation of the "reset" switch at the console keyboard 43 wherein the procedure is returned to the "reset" position in FIG. 16A which presents the set-up menu on the CRT display 33.

Although the best mode contemplated for carrying out the present invention has been herein shown and described, it will be apparent that modification and variation may be made without departing from what is regarded to be the subject matter of the invention.

What is claimed is:

1. A dynamically configurable vehicle wheel alignment system, comprising
    a plurality of vehicle wheel mounted alignment heads providing wheel alignment data and configured to be mounted on the vehicle wheels in predetermined orientation relative thereto,
    a system bus,
    communication means coupled between said plurality of alignment heads and said system bus,
    display means for visually presenting alignment data and operating instructions,
    display control means coupled between said display means and said bus,
    a controller in each of said alignment heads, communications means and display control means, and
    main processor means coupled to said bus for providing system calculations and sequencing control and for downloading decision making and communications routines from said communications and display control means controllers at system initialization, whereby the system is configured in accordance with said means which are present and coupled to said system bus.

2. An alignment system as in claim 1, comprising
    a bar code reader, and
    a bar code reader decoder coupled between said code reader and said bus,
    said means for downloading operating to load decoder decision making and communications routines into said main processor at system initialization.

3. An alignment system as in claim 1 comprising
    a plurality of system functional means, and
    a plurality of functional means control modules coupled between each of said functional means and said system bus,
    said means for downloading operating to load individual functional means decision making and communications routines into said main processor at system initialization.

4. An alignment system as in claim 1 wherein said communications means comprises
    a communications module,
    a cord extending between said communications module and each of said plurality of alignment heads, and
    a cord interface means at each end of each cord, whereby data is driven between each of said heads and said communications module.

5. An alignment system as in claim 1 wherein said communications means comprises
    a communications module, and
    a first infrared transceiver coupled to said communications module,
    and wherein each of said plurality of alignment heads comprises a second infrared tranceiver, so that when said first and ones of said second transceivers are in communication, data is passed between said heads and said communications module.

6. An alignment system as in claim 1 wherein said controller in each of said plurality of alignment heads comprises,
    means for controlling parallel measurement of alignment parameters and for storing data relative thereto,
    and wherein each of said plurality of alignment heads comprises means responsive to said communications means controller for transmitting and receiving data serially between said alignment head and said communications means.

7. An alignment system as in claim 6 wherein said means for transmitting and receiving is an infrared transceiver, and wherein said communications means controller operates to direct serial infrared transmission from the heads at separate times.

8. An alignment system as in claim 1 wherein said plurality of alignment heads comprises two front and two rear wheel mounted heads, whereby front and rear toe and camber and front caster may be measured.

9. An alignment system as in claim 1 wherein said plurality of alignment heads comprises two alignment heads and two retroreflectors, whereby front and rear toe and camber and front caster may be measured.

10. An alignment system as in claim 1 wherein said plurality of alignment heads comprises two alignment heads mounted on the vehicle steerable wheels, whereby front wheel toe, camber and caster may be measured.

11. A dynamically configurable vehicle wheel alignment system, comprising
    a plurality of vehicle wheel alignment heads configured to be mounted on vehicle wheels in predetermined orientation relative thereto,
    a system bus,
    communications means coupled between said plurality of alignment heads and said system bus,
    at least one system functional means,
    a functional means control module coupled between each one of said functional means and said system bus,
    a controller in each of said functional means control modules and said communications means, and
    main processor means coupled to said bus for providing system calculations and sequencing control and for downloading decision making and communications routines from said functional means controllers, whereby the system is configured in accordance with functional means control modules present.

12. A vehicle wheel alignment system as in claim 11 wherein said communications means comprises
    a communications module,
    a cord extending between said communications module and each of said plurality of alignment heads, and
    a cord interface means disposed at each end of each cord, whereby data is driven between each of said heads and said communications module.

13. A vehicle wheel alignment system as in claim 11 wherein said communications means comprises
    a communications module and a first infrared transceiver coupled to said communications module,
    and wherein each of said plurality of vehicle wheel alignment heads comprises a controller and a second infrared transceiver, so that when said first and ones of said second transceivers are in communication, data is passed between said heads and said communications module.

14. A vehicle wheel alignment system as in claim 11 wherein each of said alignment heads comprise means for controlling parallel measurement of alignment parameters and for storing data relative thereto, and means responsive to said communications means controller for transmitting and receiving data serially between said alignment head and said communications means.

15. A vehicle wheel alignment system as in claim 14 wherein said means for transmitting and receiving is an infrared transceiver, and wherein said communications means controller operates to require infrared transmission from the heads at separate times.

16. A vehicle wheel alignment system as in claim 15 wherein said infrared transceiver comprises means for mixing said data with a carrier frequency remote from ambient noise frequencies prior to transmission, and means for filtering said carrier frequency from said received signals prior to data extraction.

17. A vehicle wheel alignment system as in claim 15 wherein said infrared transceiver comprises means for suppressing ambient noise signals.

18. A vehicle wheel alignment system as in claim 15 wherein said infrared transceiver comprises means for preventing reception during transmission.

19. A vehicle wheel alignment system as in claim 11 wherein said at least one functional means comprises a display means and said functional means control module comprises a display control module.

20. A vehicle wheel alignment system as in claim 19 wherein said at least one functional means comprises a bar code reader, and wherein said functional means control module comprises a bar code decoder.

21. A vehicle wheel alignment system as in claim 19 wherein said at least one functional means comprises a printer, and wherein said functional means control module comprises a printer control module.

22. A vehicle wheel alignment system as in claim 19 wherein said at least one functional means comprises a voice speaker, and wherein said functional means control module comprises a voice control module.

23. A vehicle wheel alignment system as in claim 11 wherein said main processor means comprises a keyboard, whereby manual system entries may be made.

24. In a vehicle wheel alignment system having alignment heads for mounting on two or more wheels, the improvement comprising a plurality of functional control modules, a controller in each of said functional control modules and each of said alignment heads, and main processor means for providing system calculations and operational sequence control coupled to said controller in each of said functional control modules for downloading decision making and communications routines from said functional control modules, whereby the system is configured in accordance with functional control modules present.

25. A vehicle wheel alignment system as in claim 24 wherein said plurality of functional control modules comprises a communications module coupled between said main processor means and said controllers in said alignment heads, and means for presenting intelligible alignment data and operating instructions coupled to said communications module.

26. A vehicle wheel alignment system as in claim 25 wherein said means for presenting intelligible data comprises a CRT and a CRT control module.

27. A vehicle wheel alignment system as in claim 24 wherein said plurality of functional control modules comprises a bar code reader and a bar code decoder.

28. A vehicle wheel alignment system as in claim 25 wherein said means for presenting intelligible data comprises a printer and a printer control module.

29. A vehicle wheel alignment system as in claim 25 wherein said means for presenting intelligible data comprises a speaker and a voice control module.

30. In a vehicle wheel alignment system having alignment heads for obtaining wheel alignment data and configured for mounting on vehicle wheels, the improvement comprising a plurality of functional control modules, a controller in each of said functional control modules and in each of said alignment heads operating to control performance of a dedicated function for each module and to control parallel acquisition of alignment data in each head, means in each of said alignment heads for transmitting and receiving data, main processor means coupled to said controller in each alignment head and control module for directing serial transmission of data from said alignment heads during separate periods of time.

31. A vehicle wheel alignment system as in claim 30 wherein said plurality of functional control modules comprises a communications module, a cable extending between said alignment head data transmission and receiving means and said communications module, and cable driver means connected at each end of said cable.

32. A vehicle wheel alignment system as in claim 30 wherein said plurality of functional control modules comprises a communications module, and a first infrared data transceiver, and wherein said means for transmitting and receiving data in each of said alignment heads comprises second infrared data transceivers, whereby communication between said first and one of said second data transceivers enables exclusive serial transmission of data by said second transceiver as initiated by said main processor means.

33. A method of aligning wheels on a vehicle utilizing an intelligent alignment measurement system having a plurality of wheel mounted alignment heads and a remote console including a main processor and a plurality of functional modules including a communications module, comprising the steps of initializing the system by downloading digitized decision making and communications instructions from the plurality of functional modules to the main processor, whereby the system is automatically configured in accordance with the specific functional modules present in the system, measuring wheel alignment parameters and head status signals at separate ones of the vehicle wheels, digitizing the parameter and status measurements to obtain digital alignment data, storing digitized data at separate ones of the vehicle wheels, and serially transmitting and receiving instructions and digitized data between the communications module and different ones of the alignment heads.

34. The method of claim 33 wherein the step of serially transmitting and receiving comprises the step of driving the instructions and digitized data over a conducting cord.

35. The method of claim 33 wherein the step of serially transmitting and receiving comprises the steps of
transmitting the digitized data as serial pulses in the infrared range, and
receiving the digitized data as serial pulses in the infrared range.

36. The method of claim 35 wherein the step of transmitting comprises the steps of mixing the digitized instructions and data with a carrier frequency, and
wherein the step of receiving comprises the step of extracting data from the received signals by filtering noise and the carrier frequency therefrom.

37. The method of claim 35 comprising the step of suppressing received signals during the step of transmitting.

38. The method of claim 33 wherein the step of measuring comprises the step of
parallel measurement of alignment and status signals, and
wherein the step of transmitting comprises the step of converting the parallel digital alignment data to serial data.

39. The method of claim 33 wherein the alignment heads include alignment angle measuring instruments and wherein the step of measuring comprises the steps of calibrating the measuring instruments to ascertain their true zero signal levels, and storing the calibration zero signal levels.

40. A method of aligning wheels on a vehicle utilizing an intelligent alignment system having a plurality of wheel mounted alignment heads and a remote console including a main processor and a plurality of digitally communicating functional modules including a communications module, comprising the steps of
individually controlling each of the functional modules and alignment heads to perform a dedicated function,
measuring wheel alignment and head status signals at separate ones of the vehicle wheels,
digitizing the parameter and status measurements to obtain digital alignment data,
storing the digitized data at separate ones of the vehicle alignment heads, and
serially transmitting and receiving instructions and digitized data between the communications module and different ones of the alignment heads during separate periods of time.

41. The method of claim 40 wherein the step of serially transmitting and receiving comprises the step of driving the digital instructions and data over a conducting cord.

42. The method of claim 40 wherein the step of serially transmitting and receiving comprises the steps of
transmitting pulses in the infrared range, and
receiving pulses transmitted in the infrared range.

43. The method of claim 42 comprising the step of suppressing received signals during the step of transmitting.

44. The method of claim 40 wherein the step of measuring comprises the step of
parallel measurement of alignment and status signals, and
wherein the step of transmitting comprises the step of converting the parallel data to serial data.

45. The method of claim 40 wherein the alignment heads include alignment angle measuring instruments and wherein the step of measuring comprises the steps of measuring the zero reference signal levels of the measuring instruments to obtain instrument calibration factors, and storing the calibration factors for application to measured alignment quantities.

46. The method of claim 40 together with the step of entering a set of alignment specifications into main processor memory, whereby limitations relative to acceptable measured values may be indicated by the system.

* * * * *